United States Patent
Zhang et al.

(10) Patent No.: US 9,210,029 B2
(45) Date of Patent: Dec. 8, 2015

(54) LOGICAL LINK IDENTIFIER REGISTRATION METHOD, DEVICE, AND SYSTEM

(71) Applicant: Huawei Technologies Co., Ltd., Shenzhen, Guangdong (CN)

(72) Inventors: Li Zhang, Wuhan (CN); Fanglin Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 13/786,191

(22) Filed: Mar. 5, 2013

(65) Prior Publication Data
US 2014/0086263 A1    Mar. 27, 2014

Related U.S. Application Data

(63) Continuation of application No. PCT/CN2012/082192, filed on Sep. 27, 2012.

(51) Int. Cl.
*H04L 29/06* (2006.01)
*H04Q 11/00* (2006.01)
*H04L 29/12* (2006.01)

(52) U.S. Cl.
CPC ...... *H04L 29/06333* (2013.01); *H04Q 11/0067* (2013.01); *H04Q 11/0071* (2013.01); *H04L 29/06482* (2013.01); *H04L 61/10* (2013.01); *H04Q 2011/0086* (2013.01)

(58) Field of Classification Search
CPC .......................... H04L 29/06; H04L 29/06333
USPC .................... 370/458; 398/98, 67; 725/129
See application file for complete search history.

(56) References Cited

U.S. PATENT DOCUMENTS

| 7,688,843 | B2 * | 3/2010 | Haran et al. ................. 370/442 |
| 8,493,982 | B2 * | 7/2013 | Borges et al. ............ 370/395.51 |
| 2005/0047782 | A1 | 3/2005 | Davis et al. |
| 2011/0142444 | A1 | 6/2011 | Borges et al. |

(Continued)

FOREIGN PATENT DOCUMENTS

| CN | 101127716 A | 2/2008 |
| CN | 101854563 A | 10/2010 |

(Continued)

OTHER PUBLICATIONS

IEES Computer Society, IEEE Std 802ah—2004, IEEE Standards, pp. 440, 441, 442 and 443.*

(Continued)

*Primary Examiner* — Un C Cho
*Assistant Examiner* — Shah Rahman

(57) ABSTRACT

Embodiments of the present invention provide a logical link identifier (LLID) registration method, device, and system. The method includes: receiving, by a coax media converter (CMC), a first registration request sent by at least one coaxial network unit (CNU) that is connected to the CMC, where the first registration request carries the media access control (MAC) address of the CNU; and sending, by the CMC, in a first data window allocated to the CMC by an optical line terminal (OLT), a second registration request to the OLT, where the second registration request carries a first level LLID identifier allocated to the CMC by the OLT and the MAC address of the CNU, and the first data window is used for data exchange between the CMC and the OLT.

6 Claims, 10 Drawing Sheets

(56) References Cited

U.S. PATENT DOCUMENTS

| | | | |
|---|---|---|---|
| 2011/0229140 A1* | 9/2011 | Ohlen et al. | 398/79 |
| 2012/0121263 A1* | 5/2012 | Murata | 398/58 |
| 2012/0257892 A1* | 10/2012 | Boyd et al. | 398/58 |
| 2013/0142515 A1* | 6/2013 | Chen et al. | 398/67 |
| 2013/0148968 A1* | 6/2013 | Takizawa et al. | 398/66 |
| 2013/0202304 A1* | 8/2013 | Boyd et al. | 398/98 |
| 2013/0239165 A1* | 9/2013 | Garavaglia et al. | 725/129 |
| 2013/0322882 A1* | 12/2013 | Fang et al. | 398/67 |

FOREIGN PATENT DOCUMENTS

| | | |
|---|---|---|
| CN | 101882960 A | 11/2010 |
| CN | 102017522 A | 4/2011 |
| CN | 102142995 A | 8/2011 |

OTHER PUBLICATIONS

"Part 3: Carrier Sense Multiple Access with Collision Detection (CSMA/CD) access method and physical layer specifications", IEEE, 2005, 417 pages.

* cited by examiner

LOGICAL LINK IDENTIFIER REGISTRATION METHOD, DEVICE, AND SYSTEM

CROSS-REFERENCE TO RELATED APPLICATIONS

This application is a continuation of International Application No. PCT/CN2012/082192, filed on Sep. 27, 2012, which is hereby incorporated by reference in its entireties.

TECHNICAL FIELD

Embodiments of the present invention relate to the communications technologies, and in particular, to a logical link identifier (LLID) registration method, device, and system.

BACKGROUND

Among existing communication data transmission technologies, technologies for transmitting Ethernet data over a coaxial cable may be collectively referred to as an EOC (Ethernet Over COAX) technology. In the EOC technology, an end-to-multi-end network topology is adopted and an original coaxial cable in a broadcast and television network is used to implement full-service access of various data. Another Ethernet passive optical network (Ethernet Passive Optical Network, referred to as EPON) technology is an end-to-multi-end optical fiber transmission and access technology, in which downlink data is transferred by adopting a broadcast manner and uplink data is transferred by adopting a time division multiple access manner, so as to flexibly form a tree, star or bus topology, and so on.

Recently, an Ethernet passive optical network protocol over coax (EPON Protocol Over Coax, referred to as EPOC) technology emerges, which combines the EPON technology and the EOC technology and has a two-level topology. FIG. 1 is a schematic diagram of a topology of an EPOC system. As shown in FIG. 1, an EPOC includes: an optical line terminal (Optical Line Terminal, referred to as OLT) 101, an optical network unit (Optical Network Unit, referred to as ONU) 102, a coax media converter (Coax Media Converter, referred to as CMC) 103, and multiple coaxial network units (Coaxial Network Unit, referred to as CNU) 104. The CMC is an entity similar to the ONU and connects multiple CNUs to form a second level topology.

In the prior art, an OLT broadcasts a discovery window (Discovery Window) message to a CMC and an ONU in a network, and after receiving a logical link identifier (Logical Link Identifier, referred to as LLID) registration request sent by a connected CNU, the CMC may forward, in a discovery window, the LLID registration request of the CNU to the OLT. The CMC and the ONU may also send, in the discovery window, their own LLID registration request to the OLT. However, a conflict of LLID registration of the ONU, CMC and CNU might be caused in the discovery window of the OLT.

SUMMARY

Embodiments of the present invention provide a logical link identifier LLID registration method, device, and system, so as to reduce a probability of a registration conflict.

In a first aspect, a logical link identifier LLID registration method provided in an embodiment of the present invention includes: receiving, by a coax media converter CMC, a first registration request sent by at least one coaxial network unit CNU that is connected to the CMC, where the first registration request carries the media access control MAC address of the CNU; and sending, by the CMC, in a first data window allocated to the CMC by an optical line terminal OLT, a second registration request to the OLT, where the second registration request carries a first level LLID identifier allocated to the CMC by the OLT and the MAC address of the CNU, and the first data window is used for data exchange between the CMC and the OLT.

In a first possible implementation manner of the first aspect, after the sending, by the CMC, in a first data window allocated to the CMC by an optical line terminal OLT, a second registration request to the OLT, the method further includes: receiving, by the CMC, a registration message sent by the OLT, where the registration message carries the MAC address of the CNU and a second level LLID identifier that is allocated to the CNU by the OLT.

In combination with the first aspect or the first possible implementation manner of the first aspect, in a second possible implementation manner, after the sending, by the CMC, in a first data window allocated to the CMC by an optical line terminal OLT, a second registration request to the OLT, the method further includes: receiving, by the CMC, a first window message sent by the OLT, where the first window message carries the MAC address of the CNU and second data window information that is allocated to the CNU by the OLT, and the second data window is used for data exchange between the CNU and the OLT.

In combination with the first aspect or the first or second possible implementation manner of the first aspect, in a third possible implementation manner, after the receiving, by the CMC, a first window message sent by the OLT, the method further includes: sending, by the CMC, in the second data window, a registration acknowledgment message to the OLT, where the registration acknowledgment message carries the second level LLID identifier.

Ina second aspect, a logical link identifier LLID registration method provided in an embodiment of the present invention includes: sending, by an optical line terminal OLT, a second window message to a coax media converter CMC, where the second window message carries the media access control MAC address of the CMC and first data window information that is allocated to the CMC by the OLT, and the first data window is used by the CMC to send data to the OLT; and receiving, by the OLT, in the first data window, a second registration request sent by the CMC, where the second registration request carries a first level LLID identifier allocated to the CMC by the OLT and the MAC address of a CNU.

Ina first possible implementation manner of the second aspect, after the receiving, by the OLT, in the first data window, a second registration request sent by the CMC, the method further includes: allocating, by the OLT, a second level LLID identifier to the CNU according to the first level LLID identifier; and sending, by the OLT, a registration message to the CMC, where the registration message carries the MAC address of the CNU and the second level LLID identifier.

In combination with the second aspect or the first possible implementation manner of the second aspect, in a second possible implementation manner, the allocating, by the OLT, a second level LLID identifier to the CNU according to the first level LLID identifier includes: determining, by the OLT, whether the first level LLID identifier is an LLID identifier that has been allocated by the OLT to the CMC, and if yes, allocating a second level LLID identifier to the CNU.

In combination with the second aspect or the first or second possible implementation manner of the second aspect, in a third possible implementation manner, after the allocating, by the OLT, first level a second level LLID identifier to the CNU according to the first level LLID identifier, the method further includes: establishing, by the OLT, a mapping relationship between the first level LLID identifier and the second level LLID identifier.

In combination with the second aspect or the first, second or third possible implementation manner of the second aspect, in a fourth possible implementation manner, after the receiving, by the OLT, in the first data window, a second registration request sent by the CMC, the method further includes: sending, by the OLT, a first window message to the CMC, where the first window message carries the MAC address of the CNU and second data window information that is allocated to the CNU by the OLT, and the second data window is used for data exchange between the CNU and the OLT.

In combination with the second aspect or the first, second, third or fourth possible implementation manner of the second aspect, in a fifth possible implementation manner, after the sending, by the OLT, a first window message to the CMC, the method further includes: receiving, by the OLT, in the second data window, a registration acknowledgment message sent by the CMC, where the registration acknowledgment message carries the second level LLID identifier.

In a third aspect, a coax media converter CMC provided in an embodiment of the present invention includes: a first receiving module, configured to receive a first registration request sent by at least one coaxial network unit CNU that is connected to the CMC, where the first registration request carries the media access control MAC address of the CNU; and a first sending module, configured to send, in a first data window allocated to the CMC by an optical line terminal OLT, a second registration request to the OLT, where the second registration request carries a first level LLID identifier allocated to the CMC by the OLT and the MAC address of the CNU, and the first data window is used for data exchange between the CMC and the OLT.

In a first possible implementation manner of the third aspect, the first receiving module is further configured to receive a registration message sent by the OLT, where the registration message carries the MAC address of the CNU and a second level LLID identifier that is allocated to the CNU by the OLT.

In combination with the third aspect or the first possible implementation manner of the third aspect, in a second possible implementation manner, the first receiving module is further configured to receive a first window message sent by the OLT, where the first window message carries the MAC address of the CNU and second data window information that is allocated to the CNU by the OLT, and the second data window is used for data exchange between the CNU and the OLT.

In combination with the third aspect or the first or second possible implementation manner of the third aspect, in a third possible implementation manner, the first sending module is further configured to send, in the second data window, a registration acknowledgment message to the OLT, where the registration acknowledgment message carries the second level LLID identifier.

In a fourth aspect, an optical line terminal OLT provided in an embodiment of the present invention includes: a second sending module, configured to send a second window message to a coax media converter CMC, where the second window message carries the media access control MAC address of the CMC and first data window information that is allocated to the CMC by the OLT, and the first data window is used by the CMC to send data to the OLT; and a second receiving module, configured to receive, in the first data window, a second registration request sent by the CMC, where the second registration request carries a first level LLID identifier allocated to the CMC by the OLT and the MAC address of a CNU.

In a first possible implementation manner of the fourth aspect, the OLT further includes: a processing module, configured to allocate a second level LLID identifier to the CNU according to the first level LLID identifier; and the second sending module is further configured to send a registration message to the CMC, where the registration message carries the MAC address of the CNU and the second level LLID identifier.

In combination with the fourth aspect or the first possible implementation manner of the fourth aspect, in a second possible implementation manner, the processing module is further configured to determine whether the first level LLID identifier is an LLID identifier that has been allocated by the OLT to the CMC, and if yes, allocate a second level LLID identifier to the CNU.

In combination with the fourth aspect or the first or second possible implementation manner of the fourth aspect, in a third possible implementation manner, the processing module is further configured to establish a mapping relationship between the first level LLID identifier and the second level LLID identifier.

In combination with the fourth aspect or the first, second or third possible implementation manner of the fourth aspect, in a fourth possible implementation manner, the second sending module is further configured to send a first window message to the CMC, where the first window message carries the MAC address of the CNU and second data window information that is allocated to the CNU by the OLT, and the second data window is used for data exchange between the CNU and the OLT.

In combination with the fourth aspect or the first, second, third or fourth possible implementation manner of the fourth aspect, in a fifth possible implementation manner, the second receiving module is further configured to receive, in the second data window, a registration acknowledgment message sent by the CMC, where the registration acknowledgment message carries the second level LLID identifier.

In a fifth aspect, an Ethernet passive optical network protocol over coax EPOC system provided in an embodiment of the present invention includes: any coax media converter CMC and coaxial network unit CNU in the foregoing, and any optical line terminal OLT in the foregoing.

In a sixth aspect, a coax media converter CMC provided in an embodiment of the present invention includes: a first receiver, configured to receive a first registration request sent by at least one coaxial network unit CNU that is connected to the CMC, where the first registration request carries the media access control MAC address of the CNU; and a first sender, configured to send, in a first data window allocated to the CMC by an optical line terminal OLT, a second registration request to the OLT, where the second registration request carries a first level LLID identifier allocated to the CMC by the OLT and the MAC address of the CNU, and the first data window is used for data exchange between the CMC and the OLT.

In a first possible implementation manner of the sixth aspect, the first receiver is further configured to receive a registration message sent by the OLT, where the registration message carries the MAC address of the CNU and a second level LLID identifier that is allocated to the CNU by the OLT.

In combination with the sixth aspect or the first possible implementation manner of the sixth aspect, in a second possible implementation manner, the first receiver is further configured to receive a first window message sent by the OLT, where the first window message carries the MAC address of the CNU and second data window information that is allocated to the CNU by the OLT, and the second data window is used for data exchange between the CNU and the OLT.

In combination with the sixth aspect or the first or second possible implementation manner of the sixth aspect, in a third possible implementation manner, the first sender is further configured to send, in the second data window, a registration acknowledgment message to the OLT, where the registration acknowledgment message carries the second level LLID identifier.

In a seventh aspect, an optical line terminal OLT provided in an embodiment of the present invention includes: a second sender, configured to send a second window message to a coax media converter CMC, where the second window message carries the media access control MAC address of the CMC and first data window information that is allocated to the CMC by the OLT, and the first data window is used by the CMC to send data to the OLT; and a second receiver, configured to receive, in the first data window, a second registration request sent by the CMC, where the second registration request carries a first level LLID identifier allocated to the CMC by the OLT and the MAC address of a CNU.

In a first possible implementation manner of the seventh aspect, the OLT further includes: a processor, configured to allocate a second level LLID identifier to the CNU according to the first level LLID identifier; and the second sender is further configured to send a registration message to the CMC, where the registration message carries the MAC address of the CNU and the second level LLID identifier.

In combination with the seventh aspect or the first possible implementation manner of the seventh aspect, in a second possible implementation manner, the processor is further configured to determine whether the first level LLID identifier is an LLID identifier that has been allocated by the OLT to the CMC, and if yes, allocate a second level LLID identifier to the CNU.

In combination with the seventh aspect or the first or second possible implementation manner of the seventh aspect, in a third possible implementation manner, the processor is further configured to establish a mapping relationship between the first level LLID identifier and the second level LLID identifier.

In combination with the seventh aspect or the first, second or third possible implementation manner of the seventh aspect, in a fourth possible implementation manner, the second sender is further configured to send a first window message to the CMC, where the first window message carries the MAC address of the CNU and second data window information that is allocated to the CNU by the OLT, and the second data window is used for data exchange between the CNU and the OLT.

In combination with the seventh aspect or the first, second or third possible implementation manner of the seventh aspect, in the fourth possible implementation manner, the second receiver is further configured to receive, in the second data window, a registration acknowledgment message sent by the CMC, where the registration acknowledgment message carries the second level LLID identifier.

In a logical link identifier LLID registration method, device, and system provided in the embodiments of the present invention, a CMC acts as an agent to send, through its first data window, an LLID registration request of a CNU that is connected to the CMC, so as to perform information exchange through the first data window to complete the registration of an LLID of the CNU on an OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

BRIEF DESCRIPTION OF THE DRAWINGS

To describe the technical solutions in the embodiments of the present invention or in the prior art more clearly, the accompanying drawings required for describing the embodiments are briefly introduced in the following. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
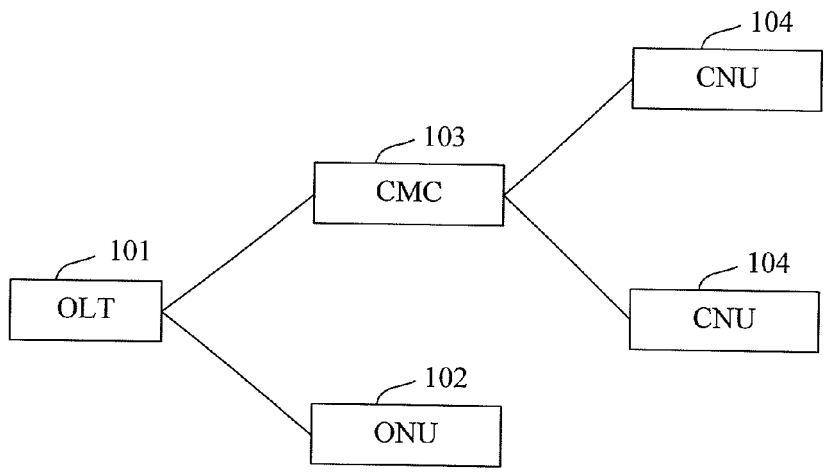
FIG. 1 is a schematic diagram of a topology of an EPOC system.
Figure 2:
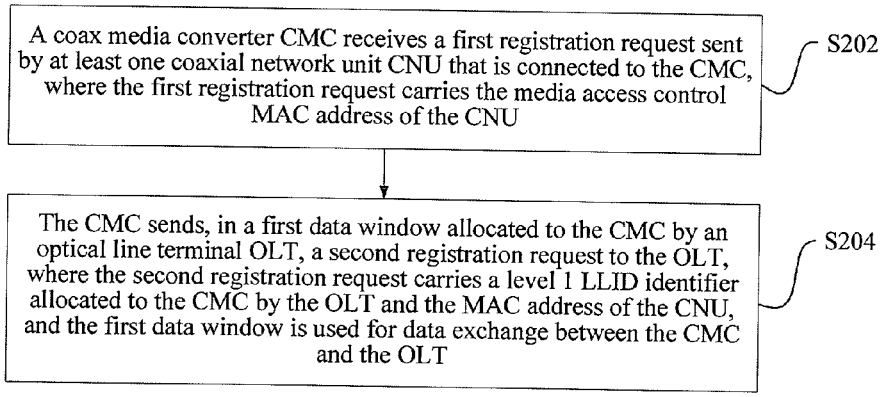
FIG. 2 is a flow chart of a logical link identifier LLID registration method according to a first embodiment of the present invention.

FIG. 2 is a flow chart of a logical link identifier LLID registration method according to a first embodiment of the present invention. As shown in FIG. 2, in this embodiment, a coaxmedia converter CMC serves as an executor to describe the LLID registration method, and the LLID registration method in this embodiment includes:

Step S202: A coax media converter CMC receives a first registration request sent by at least one coaxial network unit CNU that is connected to the CMC, where the first registration request carries the media access control MAC address of the CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration.

Step S204: The CMC sends, in a first data window allocated to the CMC by an optical line terminal OLT, a second registration request to the OLT, where the second registration request carries a first level LLID identifier allocated to the CMC by the OLT and the MAC address of the CNU, and the first data window is used for data exchange between the CMC and the OLT.

After receiving the first registration request, the CMC sends the second registration request to the OLT through the first data window allocated to the CMC by the OLT. The first data window includes an authorized bandwidth and a time slot that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

In the logical link identifier LLID registration method in this embodiment, a CMC acts as an agent to send, through its first data window, an LLID registration request of a CNU that is connected to the CMC, so as to perform information exchange through the first data window to complete the registration of an LLID of the CNU on an OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Figure 3:
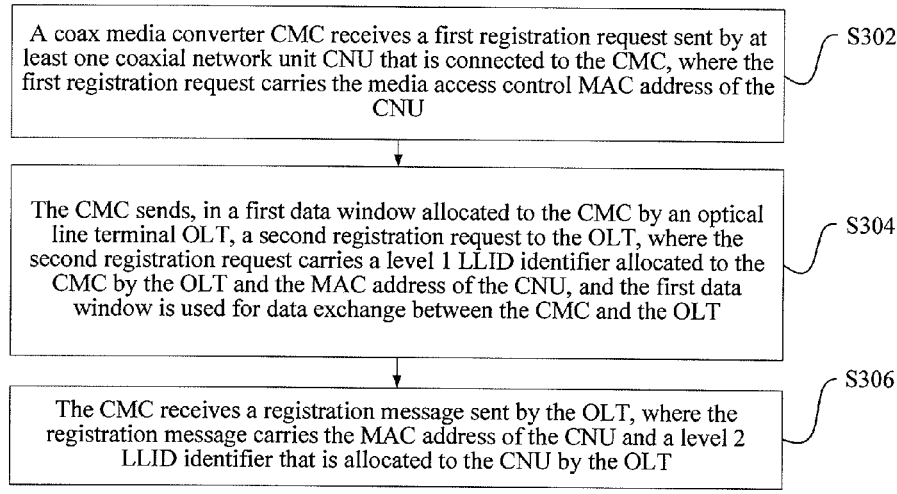
FIG. 3 is a flow chart of a logical link identifier LLID registration method according to a second embodiment of the present invention.

FIG. 3 is a flow chart of a logical link identifier LLID registration method according to a second embodiment of the present invention. As shown in FIG. 3, in this embodiment, a coax media converter CMC serves as an executor to describe the LLID registration method, and the LLID registration method in this embodiment includes:

Step S302: A coax media converter CMC receives a first registration request sent by at least one coaxial network unit CNU that is connected to the CMC, where the first registration request carries the media access control MAC address of the CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration.

Step S304: The CMC sends, in a first data window allocated to the CMC by an optical line terminal OLT, a second registration request to the OLT, where the second registration request carries a first level LLID identifier allocated to the CMC by the OLT and the MAC address of the CNU, and the first data window is used for data exchange between the CMC and the OLT.

After receiving the first registration request, the CMC sends the second registration request to the OLT through the first data window allocated to the CMC by the OLT. The first data window includes an authorized bandwidth and a time slot that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

Step S306: The CMC receives a registration message sent by the OLT, where the registration message carries the MAC address of the CNU and a second level LLID identifier that is allocated to the CNU by the OLT.

After the CMC sends the second registration request to the OLT, the OLT may return registration information to the CMC in the form of a registration frame (REGISTER), where the registration information may carry the MAC address of a CNU that applies for registration and a second level LLID identifier that is allocated by the OLT to the CNU that applies for registration. The registration information is used for notifying the CMC that the OLT has recognized the second registration request and adds the CNU that applies for registration in an uplink time slot for communication.

In the logical link identifier LLID registration method in this embodiment, a CMC acts as an agent to send, through its first data window, an LLID registration request of a CNU that is connected to the CMC, and receives a registration message returned by an OLT, so as to perform information exchange through the first data window to complete the registration of an LLID of the CNU on the OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Figure 4:
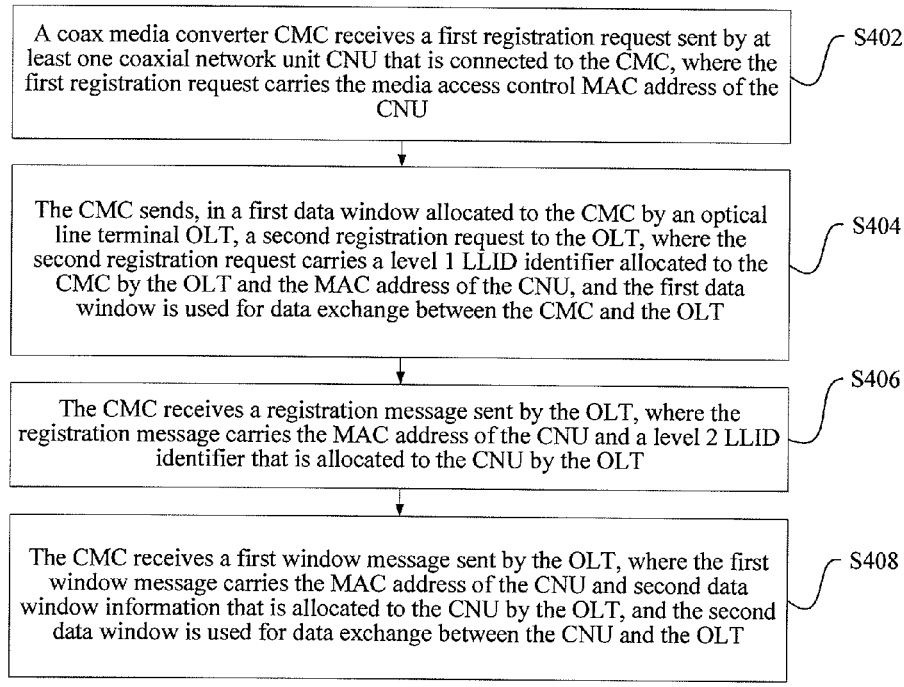
FIG. 4 is a flow chart of a logical link identifier LLID registration method according to a third embodiment of the present invention.

FIG. 4 is a flow chart of a logical link identifier LLID registration method according to a third embodiment of the present invention. As shown in FIG. 4, in this embodiment, a coax media converter CMC serves as an executor to describe the LLID registration method, and the LLID registration method in this embodiment includes:

Step S402: A coax media converter CMC receives a first registration request sent by at least one coaxial network unit CNU that is connected to the CMC, where the first registration request carries the media access control MAC address of the CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration.

Step S404: The CMC sends, in a first data window allocated to the CMC by an optical line terminal OLT, a second registration request to the OLT, where the second registration request carries a first level LLID identifier allocated to the CMC by the OLT and the MAC address of the CNU, and the first data window is used for data exchange between the CMC and the OLT.

After receiving the first registration request, the CMC sends the second registration request to the OLT through the first data window allocated to the CMC by the OLT. The first data window includes an authorized bandwidth and a time slot that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

Step S406: The CMC receives a registration message sent by the OLT, where the registration message carries the MAC address of the CNU and a second level LLID identifier that is allocated to the CNU by the OLT.

After the CMC sends the second registration request to the OLT, the OLT may return registration information to the CMC in the form of a registration frame (REGISTER), where the registration information may carry the MAC address of a CNU that applies for registration and a second level LLID identifier that is allocated by the OLT to the CNU that applies for registration. The registration information is used for notifying the CMC that the OLT has recognized the second registration request and adds the CNU that applies for registration in an uplink time slot for communication.

Step S408: The CMC receives a first window message sent by the OLT, where the first window message carries the MAC address of the CNU and second data window information that is allocated to the CNU by the OLT, and the second data window is used for data exchange between the CNU and the OLT.

The CMC receives the first window message sent by the OLT, where the first window message may be sent through the first data window in the form of a bandwidth authorization frame (GATE) and carries a destination MAC address that is the MAC address of the CNU and second data window information that is allocated by the OLT to the CNU that applies for registration, and the second data window includes an authorized bandwidth and a time slot that are used for data exchange between the CNU and the OLT.

In the logical link identifier LLID registration method in this embodiment, a CMC acts as an agent to send, through its first data window, an LLID registration request of a CNU that is connected to the CMC, and receives a registration message returned by an OLT and a first window message that is sent by the OLT through the first data window, so as to complete the registration of an LLID of the CNU on the OLT, thereby avoiding that a discovery window that is broadcast by the OLT is occupied by signaling during the registration of the LLID of the CNU, and reducing a probability of a conflict of registration signaling by using a resource of the discovery window for LLID registration of a CMC or an ONU.

Figure 5:
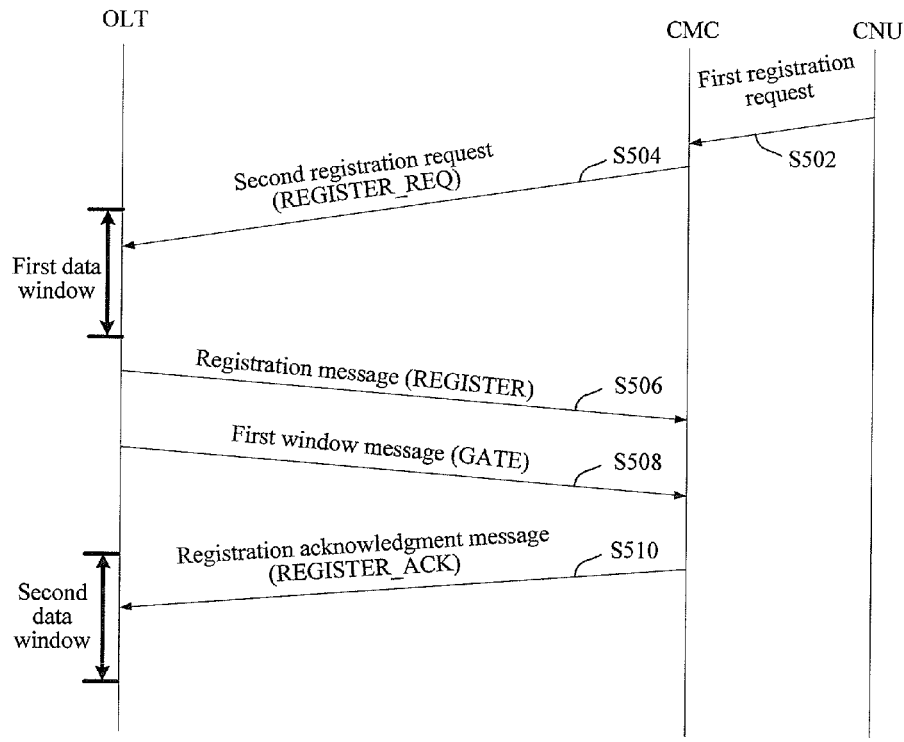
FIG. 5 is a flow chart of a logical link identifier LLID registration method according to a fourth embodiment of the present invention.

FIG. 5 is a flow chart of a logical link identifier LLID registration method according to a fourth embodiment of the present invention. As shown in FIG. 5, in this embodiment, a coax media converter serves as an executor to describe the LLID registration method, and the LLID registration method in this embodiment includes:

Step S502: A coax media converter CMC receives a first registration request sent by at least one coaxial network unit CNU that is connected to the CMC, where the first registration request carries the media access control MAC address of the CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration.

Step S504: The CMC sends, in a first data window allocated to the CMC by an optical line terminal OLT, a second registration request to the OLT, where the second registration request carries a first level LLID identifier allocated to the CMC by the OLT and the MAC address of the CNU, and the first data window is used for data exchange between the CMC and the OLT.

After receiving the first registration request, the CMC sends the second registration request to the OLT through the first data window allocated to the CMC by the OLT. The first data window includes an authorized bandwidth and a time slot that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

Step S506: The CMC receives a registration message sent by the OLT, where the registration message carries the MAC address of the CNU and a second level LLID identifier that is allocated to the CNU by the OLT.

After the CMC sends the second registration request to the OLT, the OLT may return registration information to the CMC in the form of a registration frame (REGISTER), where the registration information may carry the MAC address of a CNU that applies for registration and a second level LLID identifier that is allocated by the OLT to the CNU that applies for registration. The registration information is used for notifying the CMC that the OLT has recognized the second registration request and adds the CNU that applies for registration in an uplink time slot for communication.

Step S508: The CMC receives a first window message sent by the OLT, where the first window message carries the MAC address of the CNU and second data window information that is allocated to the CNU by the OLT, and the second data window is used for data exchange between the CNU and the OLT.

The CMC receives the first window message sent by the OLT, where the first window message may be sent through the first data window in the form of a bandwidth authorization frame (GATE) and carries a destination MAC address that is the MAC address of the CNU and second data window information that is allocated by the OLT to the CNU that applies for registration, and the second data window includes an authorized bandwidth and a time slot that are used for data exchange between the CNU and the OLT.

Step S510: The CMC sends, in the second data window, a registration acknowledgment message to the OLT, where the registration acknowledgment message carries the second level LLID identifier.

After receiving the first window message sent by the OLT, the CMC sends the registration acknowledgment message to the OLT through the second data window that is allocated to the CNU by the OLT, where the registration acknowledgment message may be sent in the form of a registration acknowledgment frame (REGISTER_ACK) and carries the second level LLID identifier allocated to the CNU by the OLT.

In the logical link identifier LLID registration method in this embodiment, a CMC acts as an agent to send, through its first data window, an LLID registration request of a CNU that is connected to the CMC, receives a registration message returned by an OLT and a first window message that is sent by the OLT through the first data window, and sends a registration acknowledgment message to the OLT through a second data window, so as to complete the registration of an LLID of the CNU on the OLT. With the logical link identifier LLID registration method in this embodiment, it is avoided that a discovery window that is broadcast by the OLT is occupied by signaling during the registration of the LLID of the CNU, thereby reducing a probability of a conflict of registration signaling by using a resource of the discovery window for LLID registration of a CMC or an ONU.

Figure 6:
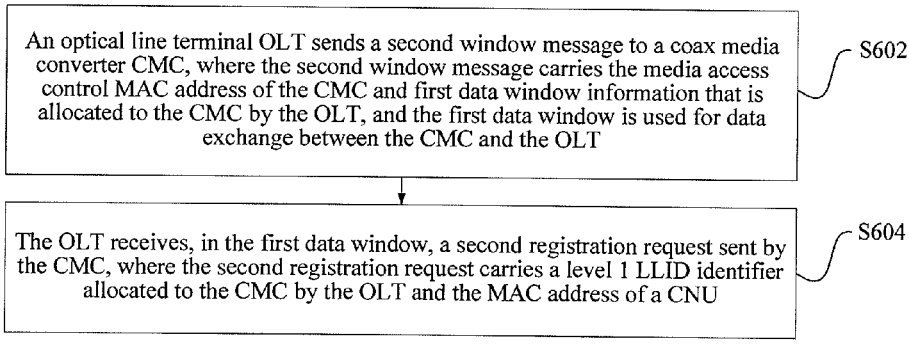
FIG. 6 is a flow chart of a logical link identifier LLID registration method according to a fifth embodiment of the present invention.

FIG. 6 is a flow chart of a logical link identifier LLID registration method according to a fifth embodiment of the present invention. As shown in FIG. 6, in this embodiment, an optical line terminal OLT serves as an executor to describe the LLID registration method, and the LLID registration method in this embodiment includes:

Step S602: An optical line terminal OLT sends a second window message to a coax media converter CMC, where the second window message carries the media access control MAC address of the CMC and first data window information that is allocated to the CMC by the OLT, and the first data window is used for data exchange between the CMC and the OLT.

During LLID registration of the CMC, the OLT sends the second window message to the CMC, where the second window message may be sent through a discovery window in the form of a bandwidth authorization frame (GATE) and carries a destination MAC address that is the MAC address of the CMC and first data window information that is allocated to the CMC by the OLT, and the first data window includes an authorized bandwidth and a time slot that are used for data exchange between the CMC and the OLT.

Step S604: The OLT receives, in the first data window, a second registration request sent by the CMC, where the second registration request carries a first level LLID identifier allocated to the CMC by the OLT and the MAC address of a CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration. After receiving the first registration request, the CMC sends a second registration request to the OLT through the first data window that is allocated to the CMC by the OLT. The first data window includes an authorized bandwidth and a time slot that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

In the logical link identifier LLID registration method in this embodiment, an OLT receives, through a first data window of a CMC, an LLID registration request of a CNU, where the CMC acts as an agent for the CNU and is connected to the CNU, so as to perform information exchange through the first data window to complete the registration of an LLID of the CNU on the OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Figure 7:
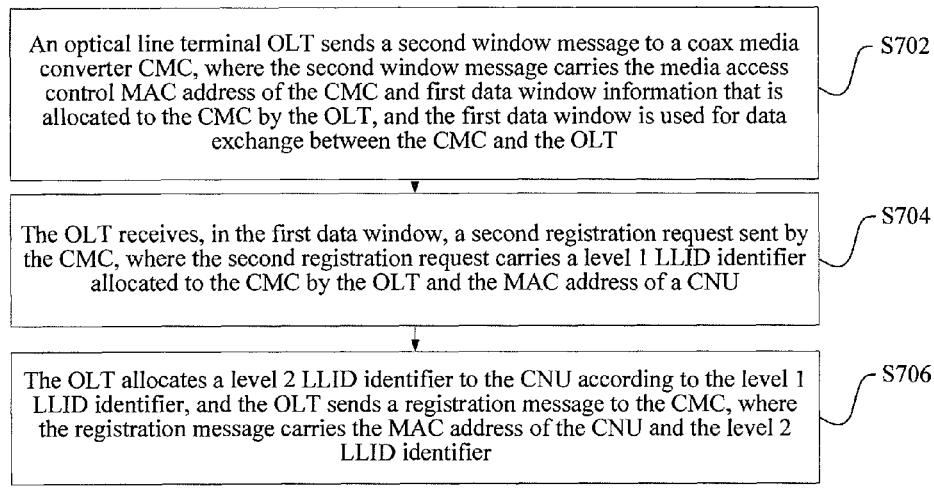
FIG. 7 is a flow chart of a logical link identifier LLID registration method according to a sixth embodiment of the present invention.

FIG. 7 is a flow chart of a logical link identifier LLID registration method according to a sixth embodiment of the present invention. As shown in FIG. 7, in this embodiment, an optical line terminal OLT serves as an executor to describe the LLID registration method, and the LLID registration method in this embodiment includes:

Step S702: An optical line terminal OLT sends a second window message to a coax media converter CMC, where the second window message carries the media access control MAC address of the CMC and first data window information that is allocated to the CMC by the OLT, and the first data window is used for data exchange between the CMC and the OLT.

During LLID registration of the CMC, the OLT sends the second window message to the CMC, where the second window message may be sent through a discovery window in the form of a bandwidth authorization frame (GATE) and carries a destination MAC address that is the MAC address of the CMC and first data window information that is allocated to the CMC by the OLT, and the first data window includes an authorized bandwidth and a time slot that are used for data exchange between the CMC and the OLT.

Step S704: The OLT receives, in the first data window, a second registration request sent by the CMC, where the second registration request carries a first level LLID identifier allocated to the CMC by the OLT and the MAC address of a CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration. After receiving the first registration request, the CMC sends a second registration request to the OLT through the first data window that is allocated to the CMC by the OLT. The first data window includes an authorized bandwidth and a time slot used that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

Step S706: The OLT allocates a second level LLID identifier to the CNU according to the first level LLID identifier, and the OLT sends a registration message to the CMC, where the registration message carries the MAC address of the CNU and the second level LLID identifier. The OLT allocates a second level LLID identifier to the CNU according to the first level LLID identifier, which may include: determining, by the OLT, whether the first level LLID identifier is an LLID identifier that has been allocated by the OLT to the CMC, and if yes, allocating a second level LLID identifier to the CNU.

After receiving the second registration request sent by the CMC, the OLT may determine whether the first level LLID identifier is an LLID identifier that has been allocated by the OLT to the CMC, and if yes, allocate a second level LLID identifier to the CNU, and may return registration information to the CMC in the form of a registration frame (REGISTER), where the registration information carries the MAC address of a CNU that applies for registration and a second level LLID identifier that is allocated by the OLT to the CNU that applies for registration. The registration information is used for notifying the CMC that the OLT has recognized the second registration request and adds the CNU that applies for registration in an uplink time slot for communication.

In the logical link identifier LLID registration method in this embodiment, an OLT receives, through a first data window of a CMC, an LLID registration request of a CNU, where the CMC acts as an agent for the CNU and is connected to the CNU; and returns a registration message to the CMC, so as to complete the registration of an LLID of the CNU on the OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Figure 8:
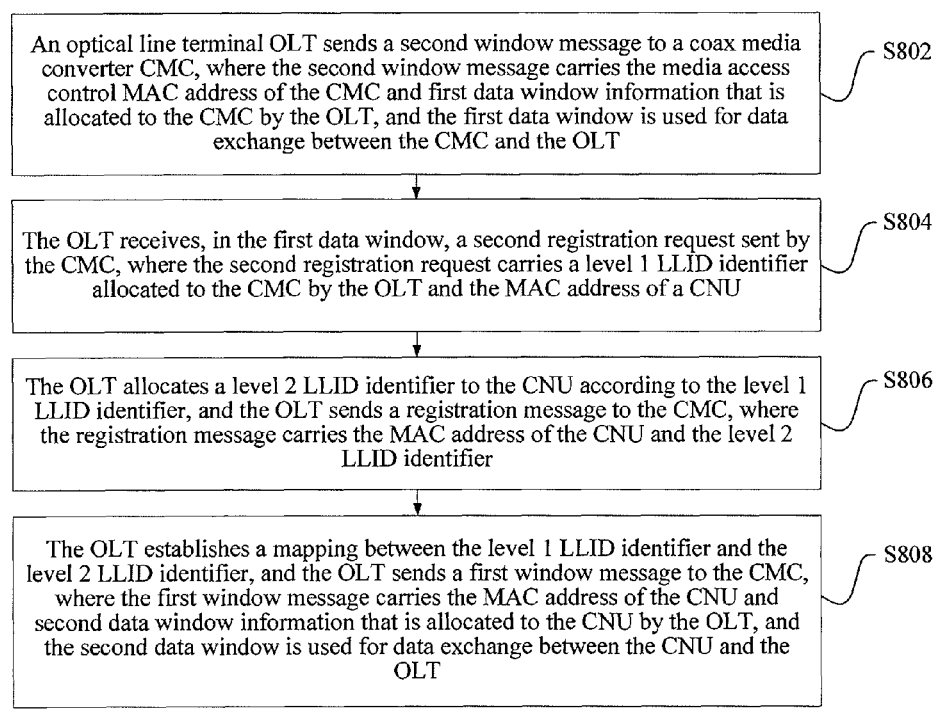
FIG. 8 is a flow chart of a logical link identifier LLID registration method according to a seventh embodiment of the present invention.

FIG. 8 is a flow chart of a logical link identifier LLID registration method according to a seventh embodiment of the present invention. As shown in FIG. 8, in this embodiment, an optical line terminal OLT serves as an executor to describe the LLID registration method, and the LLID registration method in this embodiment includes:

Step S802: An optical line terminal OLT sends a second window message to a coax media converter CMC, where the second window message carries the media access control MAC address of the CMC and first data window information that is allocated to the CMC by the OLT, and the first data window is used for data exchange between the CMC and the OLT.

During LLID registration of the CMC, the OLT sends the second window message to the CMC, where the second window message may be sent through a discovery window in the form of a bandwidth authorization frame (GATE) and carries a destination MAC address that is the MAC address of the CMC and first data window information that is allocated to the CMC by the OLT, and the first data window includes an authorized bandwidth and a time slot that are used for data exchange between the CMC and the OLT.

Step S804: The OLT receives, in the first data window, a second registration request sent by the CMC, where the second registration request carries a first level LLID identifier allocated to the CMC by the OLT and the MAC address of a CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration. After receiving the first registration request, the CMC sends a second registration request to the OLT through the first data window that is allocated to the CMC by the OLT. The first data window includes an authorized bandwidth and a time slot that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

Step S806: The OLT allocates a second level LLID identifier to the CNU according to the first level LLID identifier, and the OLT sends a registration message to the CMC, where the registration message carries the MAC address of the CNU and the second level LLID identifier. The OLT allocates a second level LLID identifier to the CNU according to the first level LLID identifier, which may include: determining, by the OLT, whether the first level LLID identifier is an LLID identifier that has been allocated by the OLT to the CMC, and if yes, allocating a second level LLID identifier to the CNU.

After receiving the second registration request sent by the CMC, the OLT may determine whether the first level LLID identifier is an LLID identifier that has been allocated by the OLT to the CMC, and if yes, allocate a second level LLID identifier to the CNU, and may return registration information to the CMC in the form of a registration frame (REGISTER), where the registration information carries the MAC address of a CNU that applies for registration and a second level LLID identifier that is allocated by the OLT to the CNU that applies for registration. The registration information is used for notifying the CMC that the OLT has recognized the second registration request and adds the CNU that applies for registration in an uplink time slot for communication.

Step S808: The OLT establishes a mapping relationship between the first level LLID identifier and the second level LLID identifier, and the OLT sends a first window message to the CMC, where the first window message carries the MAC address of the CNU and second data window information that is allocated to the CNU by the OLT, and the second data window is used for data exchange between the CNU and the OLT.

After allocating the second level LLID identifier to the CNU, the OLT may establish a mapping relationship between the first level LLID identifier and the second level LLID identifier of the CMC that acts as an agent to perform registration for the CNU, so as to know topologies of nodes such as a CMC and a CNU in EPOC.

The OLT sends the first window message to the CMC, where the first window message may be sent through the first data window in the form of a bandwidth authorization frame (GATE) and carries a destination MAC address that is the MAC address of the CNU and second data window information that is allocated by the OLT to the CNU that applies for registration, and the second data window includes an authorized bandwidth and a time slot that are used for data exchange between the CNU and the OLT.

In the logical link identifier LLID registration method in this embodiment, an OLT receives, through a first data window of a CMC, an LLID registration request of a CNU, where the CMC acts as an agent for the CNU and is connected to the CNU; and returns a registration message to the CMC. And the OLT further sends a first window message to the CMC through the first data window, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration.

Figure 9:
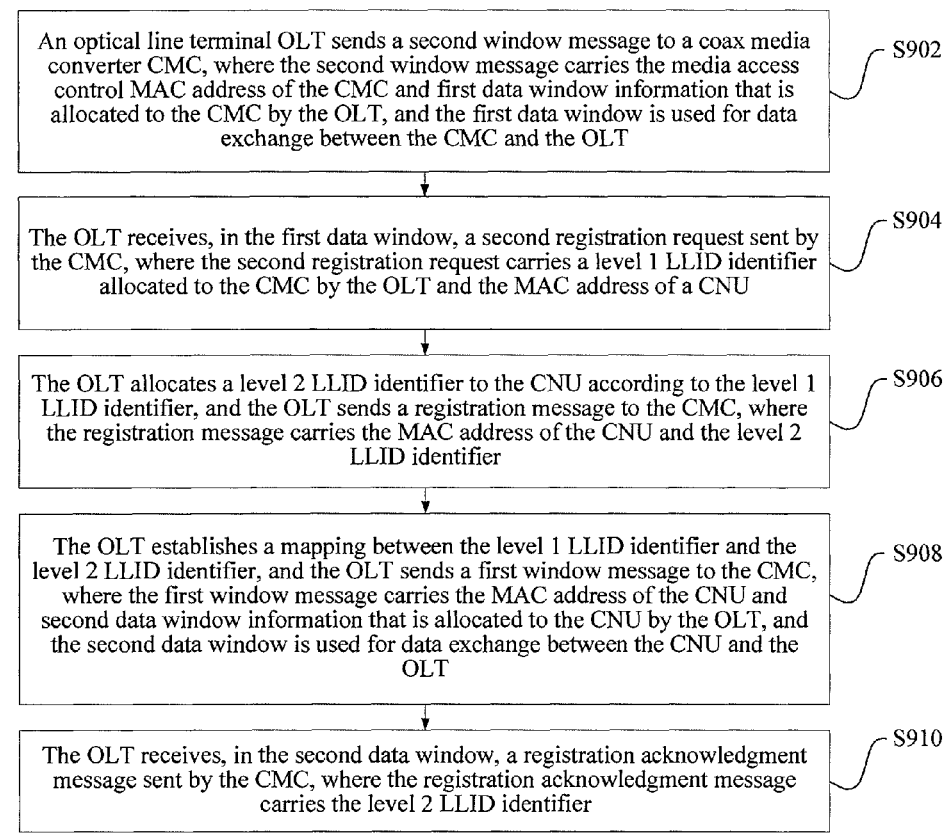
FIG. 9 is a flow chart of a logical link identifier LLID registration method according to an eighth embodiment of the present invention.

FIG. 9 is a flow chart of a logical link identifier LLID registration method according to an eighth embodiment of the present invention. As shown in FIG. 9, in this embodiment, an optical line terminal OLT serves as an executor to describe the LLID registration method, and the LLID registration method in this embodiment includes:

Step S902: An optical line terminal OLT sends a second window message to a coax media converter CMC, where the second window message carries the media access control MAC address of the CMC and first data window information that is allocated to the CMC by the OLT, and the first data window is used for data exchange between the CMC and the OLT.

During LLID registration of the CMC, the OLT sends the second window message to the CMC, where the second window message may be sent through a discovery window in the form of a bandwidth authorization frame (GATE) and carries a destination MAC address that is the MAC address of the CMC and first data window information that is allocated to the CMC by the OLT, and the first data window includes an authorized bandwidth and a time slot that are used for data exchange between the CMC and the OLT.

Step S904: The OLT receives, in the first data window, a second registration request sent by the CMC, where the second registration request carries a first level LLID identifier allocated to the CMC by the OLT and the MAC address of a CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration. After receiving the first registration request, the CMC sends a second registration request to the OLT through the first data window that is allocated to the CMC by the OLT. The first data window includes an authorized bandwidth and a time slot that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

Step S906: The OLT allocates a second level LLID identifier to the CNU according to the first level LLID identifier, and the OLT sends a registration message to the CMC, where the registration message carries the MAC address of the CNU and the second level LLID identifier. The OLT allocates a second level LLID identifier to the CNU according to the first level LLID identifier, which may include: determining, by the OLT, whether the first level LLID identifier is an LLID identifier that has been allocated by the OLT to the CMC, and if yes, allocating a second level LLID identifier to the CNU.

After receiving the second registration request sent by the CMC, the OLT may determine whether the first level LLID identifier is an LLID identifier that has been allocated by the OLT to the CMC, and if yes, allocate a second level LLID identifier to the CNU, and may return registration information to the CMC in the form of a registration frame (REGISTER), where the registration information carries the MAC address of a CNU that applies for registration and a second level LLID identifier that is allocated by the OLT to the CNU that applies for registration. The registration information is used for notifying the CMC that the OLT has recognized the second registration request and adds the CNU that applies for registration in an uplink time slot for communication.

Step S908: The OLT establishes a mapping relationship between the first level LLID identifier and the second level LLID identifier, and the OLT sends a first window message to the CMC, where the first window message carries the MAC address of the CNU and second data window information that is allocated to the CNU by the OLT, and the second data window is used for data exchange between the CNU and the OLT.

After allocating the second level LLID identifier to the CNU, the OLT may establish a mapping relationship between the first level LLID identifier and the second level LLID identifier of the CMC that acts as an agent to perform registration for the CNU, so as to know topologies of nodes such as a CMC and a CNU in EPOC.

The OLT sends a first window message to the CMC, where the first window message may be sent through the first data window in the form of a bandwidth authorization frame (GATE) and carries a destination MAC address that is the MAC address of the CNU and second data window information that is allocated by the OLT to the CNU that applies for registration, and the second data window includes an authorized bandwidth and a time slot that are used for data exchange between the CNU and the OLT.

Step S910: The OLT receives, in the second data window, a registration acknowledgment message sent by the CMC, where the registration acknowledgment message carries the second level LLID identifier.

After sending the first window message to the CMC, the OLT receives, through the second data window allocated to the CNU, the registration acknowledgment message sent by the CMC, where the registration acknowledgment message may be sent in the form of a registration acknowledgment frame (REGISTER_ACK) and carries the second level LLID identifier allocated to the CNU by the OLT.

In the logical link identifier LLID registration method in this embodiment, an OLT receives, through a first data window of a CMC, an LLID registration request of a CNU, where the CMC acts as an agent for the CNU and is connected to the CNU; and returns a registration message to the CMC. And the OLT further sends a first window message to the CMC through the first data window and receives, through a second data window, a registration acknowledgment message sent by the CMC, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration.

Figure 10A:
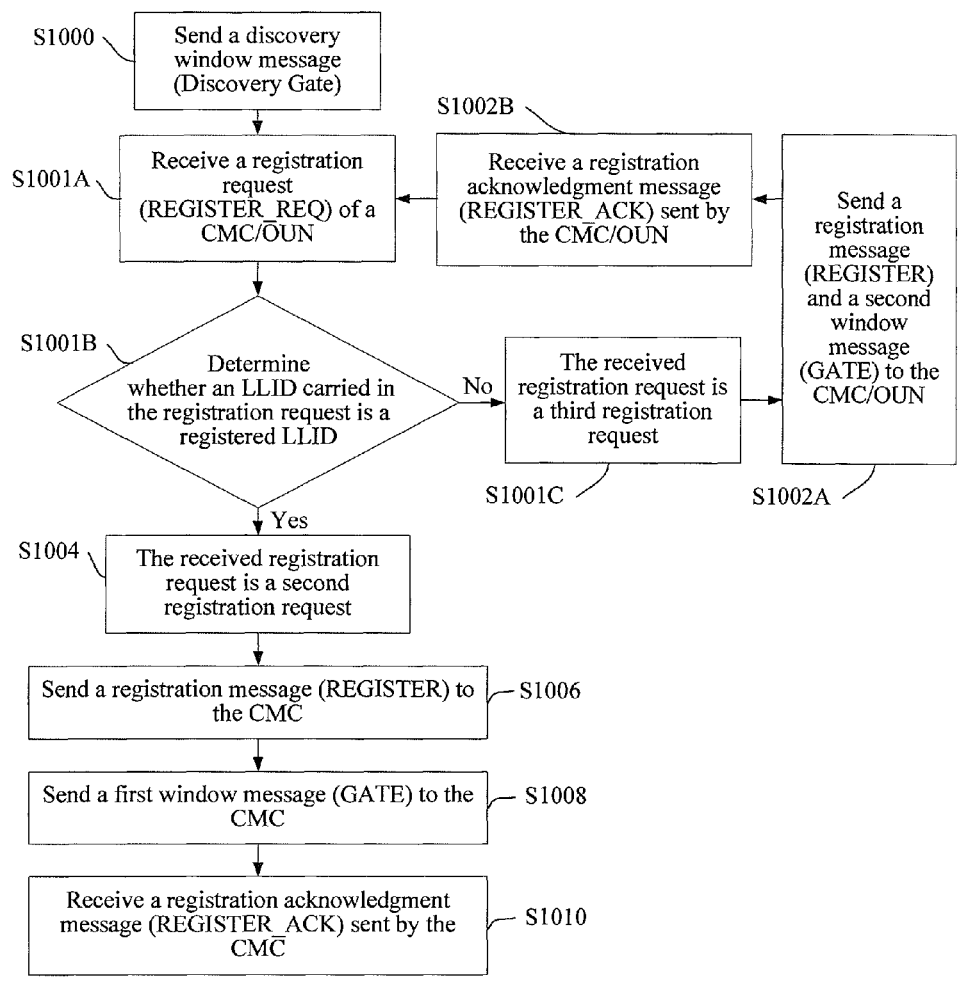
FIG. 10A is a flow chart of a logical link identifier LLID registration method according to a ninth embodiment of the present invention.

FIG. 10A is a flow chart of a logical link identifier LLID registration method according to a ninth embodiment of the present invention. As shown in FIG. 10A, in this embodiment, an optical line terminal OLT serves as an executor to describe the LLID registration method, and the LLID registration method in this embodiment includes:

Step S1000: An OLT sends a discovery window message in a broadcast form, where the discovery window message carries discovery window information, and the discovery window is used by an apparatus connected to the OLT to send a registration request.

The OLT broadcasts a discovery window message to each CMC and ONU that are connected to the OLT, where the discovery window message may be sent in the form of a registration authorization frame (DISCOVERY GATE), and the discovery window message carries information such as open time and duration of a discovery window. The discovery window is used by apparatuses, such as each CMC and ONU that are connected to the OLT, to send a registration request to the OLT.

Step S1001A: The OLT receives a registration request sent by a CMC or an ONU, where the registration request carries the MAC address of the CMC or the ONU. The OLT broadcasts the discovery window message to each CMC and ONU that are connected to the OLT, and after receiving the discovery window message, a CMC and an ONU that are unregistered or have a registration update demand may adjust a local clock according to the discovery window message, so as to start a registration process when a discovery window is opened.

After the discovery window is opened, a CMC or an ONU, which has a registration demand, randomly delays (Random Delay) for a period of time, so as to avoid a registration conflict in the discovery window, and then a registration request is sent to the OLT, where the registration request may be sent in the form of a registration request frame (REGISTER_REQ). The registration request carries information such as the MAC address of the CMC or the ONU, which sends the registration request, and an optical device parameter.

Step S1001B: The OLT determines whether an LLID carried in the received registration request is a registered LLID. If it is known, through determination, that the LLID carried in the registration request has not been registered, perform step S1001C; and if it is known, through determination, that the LLID carried in the registration request has been registered, perform step S1004.

Step S1001C: If The OLT knows, through determination, that the LLID carried in the registration request has not been registered, it is determined that the received registration request is a third registration request.

Step S1002A: The OLT sends a registration message (REGISTER) and a second window message (GATE) to the CMC or the OUN.

After receiving the third registration request sent by the CMC or the ONU, the OLT sends the registration message and the second window message to the CMC or the ONU. The registration message carries the MAC address of the CMC or the ONU and a first level LLID identifier that is allocated to the CMC or the ONU. The second window message carries the MAC address of the CMC or the ONU and first data window information that is allocated to the CMC or the ONU by the OLT, and the first data window is used for data exchange between the CMC and the OLT; and the second window message may be sent through a discovery window in the form of a bandwidth registration frame (GATE) and carries a destination MAC address that is the MAC address of the CMC and the first data window information that is allocated to the CMC by the OLT, and the first data window includes an authorized bandwidth and a time slot that are used for data exchange between the CMC and the OLT.

Step S1002B: The OLT receives a registration acknowledgment message (REGISTER_ACK) sent by the CMC or the OUN, to complete LLID registration of the CMC or the OUN.

Step S1004: If the OLT knows, through determination, that the LLID carried in the registration request has been registered, it is determined that the received registration request is a second registration request, that is, a registration request of a CNU for which the CMC acts as an agent.

Step S1006: The OLT allocates a second level LLID identifier to the CNU according to the first level LLID identifier, and the OLT sends a registration message to the CMC, where the registration message carries the MAC address of the CNU and the second level LLID identifier. The OLT allocates a second level LLID identifier to the CNU according to the first level LLID identifier, which may include: determining, by the OLT, whether the first level LLID identifier is an LLID identifier that has been allocated by the OLT to the CMC, and if yes, allocating a second level LLID identifier to the CNU.

After receiving the second registration request sent by the CMC, the OLT may determine whether the first level LLID identifier is an LLID identifier that has been allocated by the OLT to the CMC, and if yes, allocate a second level LLID identifier to the CNU, and may return registration information to the CMC in the form of a registration frame (REGISTER), where the registration information carries the MAC address of a CNU that applies for registration and a second level LLID identifier that is allocated by the OLT to the CNU that applies for registration. The registration information is used for notifying the CMC that the OLT has recognized the second registration request and adds the CNU that applies for registration in an uplink time slot for communication.

Step S1008: The OLT establishes a mapping relationship between the first level LLID identifier and the second level LLID identifier, and the OLT sends a first window message to the CMC, where the first window message carries the MAC address of the CNU and second data window information that is allocated to the CNU by the OLT, and the second data window is used for data exchange between the CNU and the OLT.

After allocating the second level LLID identifier to the CNU, the OLT may establish a mapping relationship between the first level LLID identifier and the second level LLID identifier of the CMC that acts as an agent to perform registration for the CNU, so as to know topologies of nodes such as a CMC and a CNU in EPOC.

The OLT sends a first window message to the CMC, where the first window message may be sent through the first data window in the form of a bandwidth authorization frame (GATE) and carries a destination MAC address that is the MAC address of the CNU and second data window information that is allocated by the OLT to the CNU that applies for registration, and the second data window includes an authorized bandwidth and a time slot that are used for data exchange between the CNU and the OLT.

Step S1010: The OLT receives, in the second data window, a registration acknowledgment message sent by the CMC, where the registration acknowledgment message carries the second level LLID identifier.

After sending the first window message to the CMC, the OLT receives, through the second data window allocated to the CNU, the registration acknowledgment message sent by the CMC, where the registration acknowledgment message may be sent in the form of a registration acknowledgment frame (REGISTER_ACK) and carries the second level LLID identifier allocated to the CNU by the OLT.

In the logical link identifier LLID registration method in this embodiment, an OLT receives, through a first data window of a CMC, an LLID registration request of a CNU, where the CMC acts as an agent for the CNU and is connected to the CNU; and returns a registration message to the CMC. And the OLT further sends a first window message to the CMC through the first data window, and receives, through a second data window, a registration acknowledgment message sent by the CMC, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration.

On the basis of the foregoing embodiments, before the OLT sends a first window message to the CMC, the method further includes: determining, by the OLT, a distance between the OLT and the CMC according to time of broadcasting a window message and time of receiving a third registration request; and determining, by the OLT, a second data window according to the distance between the OLT and the CMC.

In other words, the OLT may use a result of measuring a distance of the CMC during the registration of the CMC to determine a bandwidth or a time slot of a second data window granted for the CNU, thereby avoiding performing distance measurement on the CNU again and simplifying a registration process.

Figure 10B:
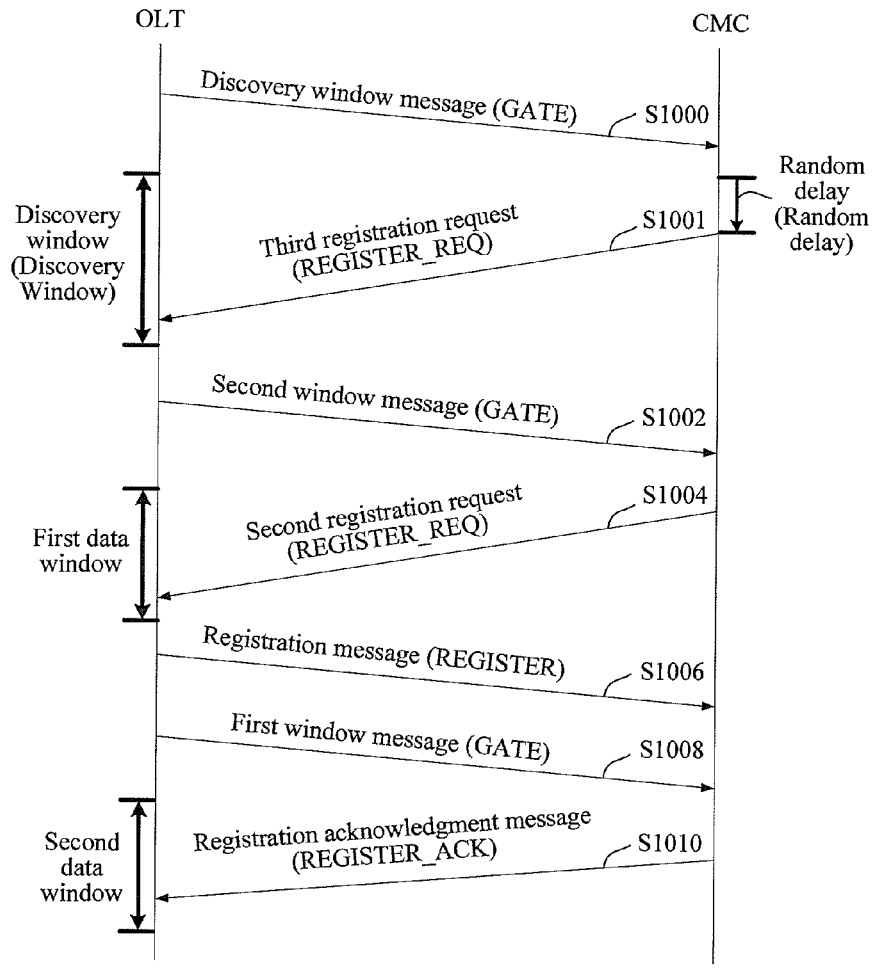
FIG. 10B is a flow chart of a logical link identifier LLID registration method according to a tenth embodiment of the present invention.

FIG. 10B is a flow chart of a logical link identifier LLID registration method according to a tenth embodiment of the present invention. As shown in FIG. 10B, in this embodiment, an exchange process between an OLT and a CMC in the LLID registration method is described, and the LLID registration method in this embodiment includes:

Step S1000: An OLT broadcasts a discovery window message, where the discovery window message carries discovery window information, and the discovery window is used by an apparatus connected to the OLT to send a registration request.

The OLT broadcasts a discovery window message to each CMC and ONU that are connected to the OLT, where the discovery window message may be sent in the form of a registration authorization frame (DISCOVERY GATE), and the discovery window message carries information such as open time and duration of a discovery window. The discovery window is used by apparatuses, such as each CMC and ONU that are connected to the OLT, to send a registration request to the OLT.

Step S1001: A CMC sends a third registration request to the OLT, where the third registration request carries the MAC address of the CMC.

The OLT broadcasts the discovery window message to each CMC and ONU that are connected to the OLT, and after receiving the discovery window message, a CMC and an ONU that are unregistered or have a registration update demand may adjust a local lock according to the discovery window message, so as to start a registration process when a discovery window is opened.

After the discovery window is opened, a CMC or an ONU, which has a registration demand, randomly delays (Random Delay) for a period of time, so as to avoid a registration conflict in the discovery window, and then a third registration request is sent to the OLT, and the third registration request may be sent in the form of a registration request frame (REGISTER_REQ). The third registration request carries information such as the MAC address of the CMC or ONU, which sends the third registration request, and an optical device parameter.

Step S1002: The OLT sends a second window message to the coax media converter CMC, where the second window message carries the media access control MAC address of the CMC and first data window information that is allocated to the CMC by the OLT, and the first data window is used for data exchange between the CMC and the OLT.

During LLID registration of the CMC, the OLT sends the second window message to the CMC, where the second window message may be sent through a discovery window in the form of a bandwidth authorization frame (GATE) and carries a destination MAC address that is the MAC address of the CMC and first data window information that is allocated to the CMC by the OLT, and the first data window includes an authorized bandwidth and a time slot that are used for data exchange between the CMC and the OLT.

Step S1004: The CMC sends, in the first data window, a second registration request to the OLT, where the second registration request carries a first level LLID identifier allocated to the CMC by the OLT and the MAC address of a CNU.

In an EPOC system, in the case that a CMC is connected to at least one CNU, the CMC receives a first registration request sent by the CNU that is connected to the CMC to act as an agent for the CNU that has a registration demand, so as to initiate a registration request, where the first registration request may carry the MAC address of a CNU that requests registration. After receiving the first registration request, the CMC sends a second registration request to the OLT through the first data window that is allocated to the CMC by the OLT. The first data window includes an authorized bandwidth and a time slot that are used for data exchange between the CMC and the OLT and are allocated to the CMC by the OLT through a bandwidth authorization frame (GATE) during LLID registration of the CMC; and the second registration request may be sent to the OLT in the form of a registration request frame (REGISTER_REQ), and the second registration request carries the first level LLID identifier allocated to the CMC by the OLT through a registration frame (REGISTER) during the LLID registration of the CMC and the MAC address of the CNU that has a registration demand.

Step S1006: The OLT allocates a second level LLID identifier to the CNU according to the first level LLID identifier, and the OLT sends a registration message to the CMC, where the registration message carries the MAC address of the CNU and the second level LLID identifier. The OLT allocates a second level LLID identifier to the CNU according to the first level LLID identifier, which may include: determining, by the OLT, whether the first level LLID identifier is an LLID identifier that has been allocated by the OLT to the CMC, and if yes, allocating a second level LLID identifier to the CNU.

After receiving the second registration request sent by the CMC, the OLT may determine whether the first level LLID identifier is an LLID identifier that has been allocated by the OLT to the CMC, and if yes, allocate a second level LLID identifier to the CNU, and may return registration information to the CMC in the form of a registration frame (REGISTER), where the registration information carries the MAC address of a CNU that applies for registration and a second level LLID identifier that is allocated by the OLT to the CNU that applies for registration. The registration information is used for notifying the CMC that the OLT has recognized the second registration request and adds the CNU that applies for registration in an uplink time slot for communication.

Step S1008: The OLT establishes a mapping relationship between the first level LLID identifier and the second level LLID identifier, and the OLT sends a first window message to the CMC, where the first window message carries the MAC address of the CNU and second data window information that is allocated to the CNU by the OLT, and the second data window is used for data exchange between the CNU and the OLT.

After allocating the second level LLID identifier to the CNU, the OLT may establish a mapping relationship between the first level LLID identifier and the second level LLID identifier of the CMC that acts as an agent to perform registration for the CNU, so as to know topologies of nodes such as a CMC and a CNU in EPOC.

The OLT sends the first window message to the CMC, where the first window message may be sent through the first data window in the form of a bandwidth authorization frame (GATE) and carries a destination MAC address that is the MAC address of the CNU and second data window information that is allocated by the OLT to the CNU that applies for registration, and the second data window includes an authorized bandwidth and a time slot that are used for data exchange between the CNU and the OLT.

Step S1010: The CMC sends, in the second data window, a registration acknowledgment message to the OLT, where the registration acknowledgment message carries the second level LLID identifier.

After sending the first window message to the CMC, the OLT receives, through the second data window allocated to the CNU, the registration acknowledgment message sent by the CMC, where the registration acknowledgment message may be sent in the form of a registration acknowledgment frame (REGISTER_ACK) and carries the second level LLID identifier allocated to the CNU by the OLT.

In the logical link identifier LLID registration method in this embodiment, an OLT receives, through a first data window of a CMC, an LLID registration request of a CNU, where the CMC acts as an agent for the CNU and is connected to the CNU; and returns a registration message to the CMC. And the CMC receives, through the first data window, a first window message sent by the OLT, and sends a registration acknowledgment message to the OLT through a second data window, so as to complete the registration of an LLID of the CNU on the OLT, whereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration.

On the basis of the foregoing embodiments, before the OLT sends a first window message to the CMC, the method further includes: determining, by the OLT, a distance between the OLT and the CMC according to time of broadcasting a window message and time of receiving a third registration request; and determining, by the OLT, a second data window according to the distance between the OLT and the CMC.

In other words, the OLT may use a result of measuring a distance of the CMC during the registration of the CMC to determine a bandwidth or a time slot of a second data window granted for the CNU, thereby avoiding performing distance measurement on the CNU again and simplifying a registration process.

Figure 11:
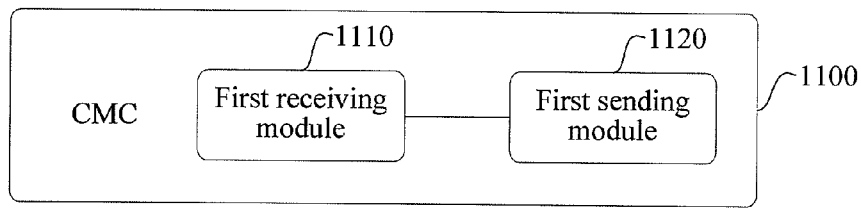
FIG. 11 is a schematic structural diagram of a coax media converter CMC according to a first embodiment of the present invention.

FIG. 11 is a schematic structural diagram of a coax media converter CMC according to a first embodiment of the present invention. As shown in FIG. 11, a coax media converter CMC 1100 in this embodiment includes:

a first receiving module 1110, configured to receive a first registration request sent by at least one coaxial network unit CNU that is connected to the CMC 1100, where the first registration request carries the media access control MAC address of the CNU; and a first sending module 1120, configured to send, in a first data window allocated to the CMC 1100 by an optical line terminal OLT, a second registration request to the OLT, where the second registration request carries a first level LLID identifier allocated to the CMC 1100 by the OLT and the MAC address of the CNU, and the first data window is used for data exchange between the CMC 1100 and the OLT.

The CMC 1100 in this embodiment may be configured to perform the technical solution in the method embodiment shown in FIG. 2, and for a specific process of performing the method, reference may be made to the related description of the method embodiment shown in FIG. 2, which is not described herein again.

By setting a first receiving module and a first sending module, the CMC provided in this embodiment may act as an agent to send, through its first data window, an LLID registration request of a CNU that is connected to the CMC, so as to perform information exchange through the first data window to complete the registration of an LLID of the CNU on an OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Further, the first receiving module 1110 in the CMC 1100 may further be configured to receive a registration message sent by the OLT, where the registration message carries the MAC address of the CNU and a second level LLID identifier that is allocated to the CNU by the OLT.

The CMC 1100 in this embodiment may be configured to perform the technical solution in the method embodiment shown in FIG. 3, and for a specific process of performing the method, reference may be made to the related description of the method embodiment shown in FIG. 3, which is not described herein again.

By setting a first receiving module and a first sending module, the CMC provided in this embodiment may act as an agent to send, through its first data window, an LLID registration request of a CNU that is connected to the CMC, and receive a registration message returned by an OLT, so as to perform information exchange through the first data window to complete the registration of an LLID of the CNU on the OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Further, the first receiving module 1110 in the CMC 1100 may further be configured to receive a first window message sent by the OLT, where the first window message carries the MAC address of the CNU and second data window information that is allocated to the CNU by the OLT, and the second data window is used for data exchange between the CNU and the OLT.

The CMC 1100 in this embodiment may be configured to perform the technical solution in the method embodiment shown in FIG. 4, and for a specific process of performing the method, reference may be made to the related description of the method embodiment shown in FIG. 4, which is not described herein again.

By setting a first receiving module and a first sending module, the CMC provided in this embodiment may act as an agent to send, through its first data window, an LLID registration request of a CNU that is connected to the CMC, and receive a registration message returned by an OLT and a first window message that is sent by the OLT through the first data window, so as to complete the registration of an LLID of the CNU on the OLT, thereby avoiding that a discovery window that is broadcast by the OLT is occupied by signaling during the registration of the LLID of the CNU, and reducing a probability of a conflict of registration signaling by using a resource of the discovery window for LLID registration of CMC or an ONU.

Further, the first sending module 1120 in the CMC 1100 is further configured to send, in the second data window, a registration acknowledgment message to the OLT, where the registration acknowledgment message carries the second level LLID identifier.

The CMC 1100 in this embodiment may be configured to perform the technical solution in the method embodiment shown in FIG. 5, and for a specific process of performing the method, reference may be made to the related description of the method embodiment shown in FIG. 5, which is not described herein again.

By setting a first receiving module and a first sending module, the CMC provided in this embodiment may act as an agent to send, through its first data window, an LLID registration request of a CNU that is connected to the CMC, receive a registration message returned by an OLT and a first window message that is sent by the OLT through the first data window, and send a registration acknowledgment message to the OLT through a second data window, so as to complete the registration of an LLID of the CNU on the OLT. With the logical link identifier LLID registration method in this embodiment, it is avoided that a discovery window that is broadcast by the OLT is occupied by signaling during the registration of the LLID of the CNU, thereby reducing a probability of a conflict of registration signaling by using a resource of the discovery window for LLID registration of a CMC or an ONU.

Figure 12:
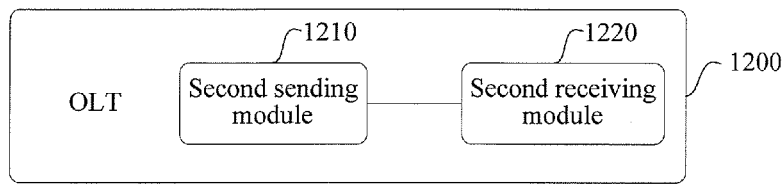
FIG. 12 is a schematic structural diagram of an optical line terminal OLT according to a first embodiment of the present invention.

FIG. 12 is a schematic structural diagram of an optical line terminal OLT according to a first embodiment of the present invention. As shown in FIG. 12, the optical line terminal OLT 1200 in this embodiment includes:

a second sending module 1210, configured to send a second window message to a coax media converter CMC, where the second window message carries the media access control MAC address of the CMC and first data window information that is allocated to the CMC by the OLT 1200, and the first data window is used by the CMC to send data to the OLT 1200; and a second receiving module 1220, configured to receive, in the first data window, a second registration request sent by the CMC, where the second registration request carries a first level LLID identifier allocated to the CMC by OLT 1200 and the MAC address of a CNU.

The OLT 1200 in this embodiment may be configured to perform the technical solution in the method embodiment shown in FIG. 6, and for a specific process of performing the method, reference may be made to the related description of the method embodiment shown in FIG. 6, which is not described herein again.

By setting a second sending module and a second receiving module, the OLT provided in this embodiment may receive, through a first data window of a CMC, an LLID registration request of a CNU, where the CMC acts as an agent for the CNU and is connected to the CNU, so as to perform information exchange through the first data window to complete the registration of an LLID of the CNU on the OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Figure 13:
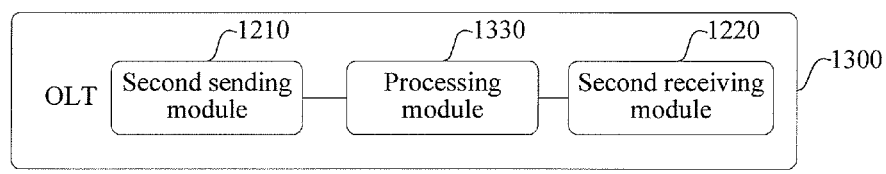
FIG. 13 is a schematic structural diagram of an optical line terminal OLT according to a second embodiment of the present invention.

FIG. 13 is a schematic structural diagram of an optical line terminal OLT according to a second embodiment of the present invention. As shown in FIG. 13, in addition to the second sending module 1210 and the second receiving module 1220 in the foregoing embodiment, the optical line terminal OLT 1300 in this embodiment further includes:

a processing module 1330, configured to allocate a second level LLID identifier to the CNU according to the first level LLID identifier; where the second sending module 1210 is further configured to send a registration message to the CMC, and the registration message carries the MAC address of the CNU and the second level LLID identifier.

The processing module 1330 may further be configured to determine whether the first level LLID identifier is an LLID identifier that has been allocated by the OLT 1300 to the CMC, and if yes, allocate a second level LLID identifier to the CNU.

The OLT 1300 in this embodiment may be configured to perform the technical solution in the method embodiment shown in FIG. 7, and for a specific process of performing the method, reference may be made to the related description of the method embodiment shown in FIG. 7, which is not described herein again.

By setting a second sending module, a second receiving module, and a processing module, the OLT provided in this embodiment may receive, through a first data window of a CMC, an LLID registration request of a CNU, where the CMC acts as an agent for the CNU and is connected to the CNU; and return a registration message to the CMC, so as to complete the registration of an LLID of the CNU on the OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Further, the processing module 1330 in the OLT 1300 may further be configured to establish a mapping relationship between the first level LLID identifier and the second level LLID identifier.

The second sending module 1210 is further configured to send a first window message to the CMC, where the first window message carries the MAC address of the CNU and second data window information that is allocated to the CNU by the OLT 1300, and the second data window is used for data exchange between the CNU and the OLT 1300.

The OLT 1300 in this embodiment may be configured to perform the technical solution in the method embodiment shown in FIG. 8, and for a specific process of performing the method, reference may be made to the related description of the method embodiment shown in FIG. 8, which is not described herein again.

By setting a second sending module, a second receiving module, and a processing module, the OLT provided in this embodiment may receive, through a first data window of a CMC, an LLID registration request of a CNU, where the CMC acts as an agent for the CNU and is connected to the CNU; and return a registration message to the CMC. And the OLT further sends a first window message to the CMC through the first data window, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration.

Further, the second receiving module 1220 in the OLT 1300 is further configured to receive, in the second data window, a registration acknowledgment message sent by the CMC, where the registration acknowledgment message carries the second level LLID identifier.

The OLT 1300 in this embodiment may be configured to perform the technical solution in the method embodiment shown in FIG. 9, and for a specific process of performing the method, reference may be made to the related description of the method embodiment shown in FIG. 9, which is not described herein again.

By setting a second sending module, a second receiving module, and a processing module, the OLT provided in this embodiment may receive, through a first data window of a CMC, an LLID registration request of a CNU, where the CMC acts as an agent for the CNU and is connected to the CNU; and return a registration message to the CMC. And the OLT further sends a first window message to the CMC through the first data window, and receives, through a second data window, a registration acknowledgment message sent by the CMC, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration.

Further, the second sending module 1210 in the OLT 1300 is further configured to broadcast a discovery window message, where the discovery window message carries discovery window information, and the discovery window is used by an apparatus connected to the OLT 1300 to send a registration request.

The second receiving module 1220 is further configured to receive a third registration request sent by the CMC, where the third registration request carries the MAC address of the CMC.

The OLT 1300 in this embodiment may be configured to perform the technical solution in the method embodiment shown in FIG. 10A, and for a specific process of performing the method, reference may be made to the related description of the method embodiment shown in FIG. 10A, which is not described herein again.

By setting a second sending module, a second receiving module, and a processing module, the OLT provided in this embodiment may receive, through a first data window of a CMC, an LLID registration request of a CNU, where the CMC acts as an agent for the CNU and is connected to the CNU; and return a registration message to the CMC. And the OLT further sends a first window message to the CMC through the first data window, and receives, through the second data window, a registration acknowledgment message sent by the CMC, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration.

Figure 14:
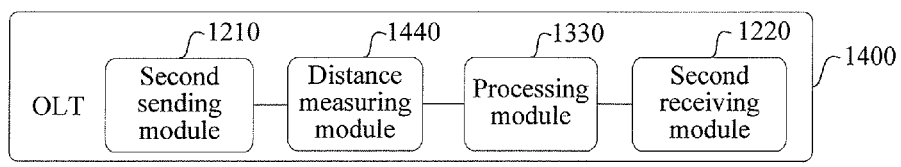
FIG. 14 is a schematic structural diagram of an optical line terminal OLT according to a third embodiment of the present invention.

FIG. 14 is a schematic structural diagram of an optical line terminal OLT according to a third embodiment of the present invention. As shown in FIG. 14, in addition to the second sending module 1210, the second receiving module 1220, and the processing module 1330, the optical line terminal OLT 1400 in this embodiment further includes:

a distance measuring module 1440, configured to determine a distance between the OLT 1400 and the CMC according to time of broadcasting a window message and time of receiving a third registration request; where the processing module 1330 is further configured to determine a second data window according to the distance between the OLT 1400 and the CMC.

The OLT 1400 in this embodiment may also be configured to perform the technical solution in the method embodiment shown in FIG. 10A, and for a specific process of performing the method, reference may be made to the related description of the method embodiment shown in FIG. 10A, which is not described herein again.

By setting a second sending module, a second receiving module, a processing module, and a distance measuring module, the OLT provided in this embodiment may receive, through a first data window of a CMC, an LLID registration request of a CNU, where the CMC acts as an agent for the CNU and is connected to the CNU; and return a registration message to the CMC. And the OLT further sends a first window message to the CMC through the first data window, and receives, through a second data window, a registration acknowledgment message sent by the CMC, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration. The OLT may use a result of measuring a distance of the CMC during the registration of the CMC to determine a bandwidth or a time slot of a second data window granted for the CNU, thereby avoiding performing distance measurement on the CNU again and simplifying a registration process.

An EPOC system provided in an embodiment of the present invention may include any CMC, CNU and OLT in the foregoing embodiments.

Figure 15:
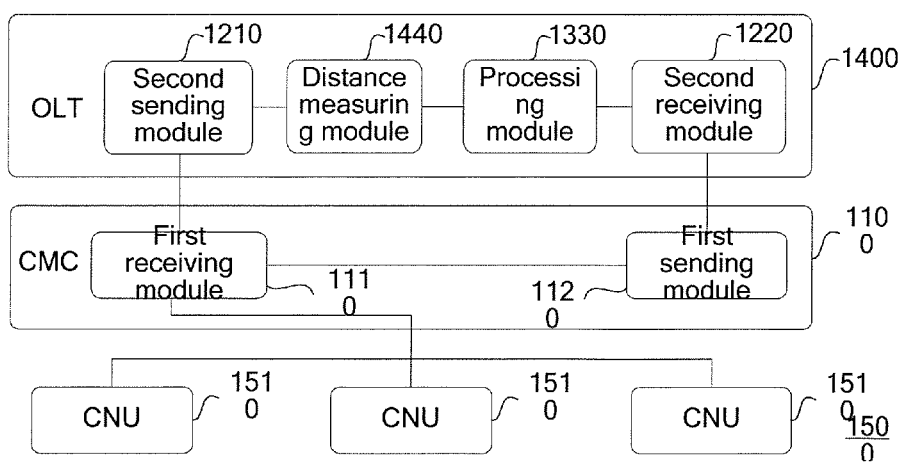
FIG. 15 is a schematic structural diagram of an EPOC system according to a first embodiment of the present invention.

FIG. 15 is a schematic structural diagram of an EPOC system according to a first embodiment of the present invention. As shown in FIG. 15, in this embodiment, by taking one implementation manner as an example, an EPOC system 1500 includes:

multiple CNUs 1510, the CMC 1100 in the embodiment shown in FIG. 11, and the OLT 1400 provided in the embodiment shown in FIG. 14, and for a specific process of performing the method, reference may be made to the related description of the method embodiment shown in FIG. 10B, which is not described herein again.

In the EPOC system in this embodiment, an OLT receives, through a first data window of a CMC, an LLID registration request of a CNU, where the CMC acts as an agent for the CNU and is connected to the CNU; and returns a registration message to the CMC. And the CMC receives, through the first data window, a first window message sent by the OLT, and sends a registration acknowledgment message to the OLT through a second data window, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration. The OLT may use a result of measuring a distance of the CMC during the registration of the CMC to determine a bandwidth or a time slot of a second data window granted for the CNU, thereby avoiding performing distance measurement on the CNU again and simplifying a registration process.

Figure 16:
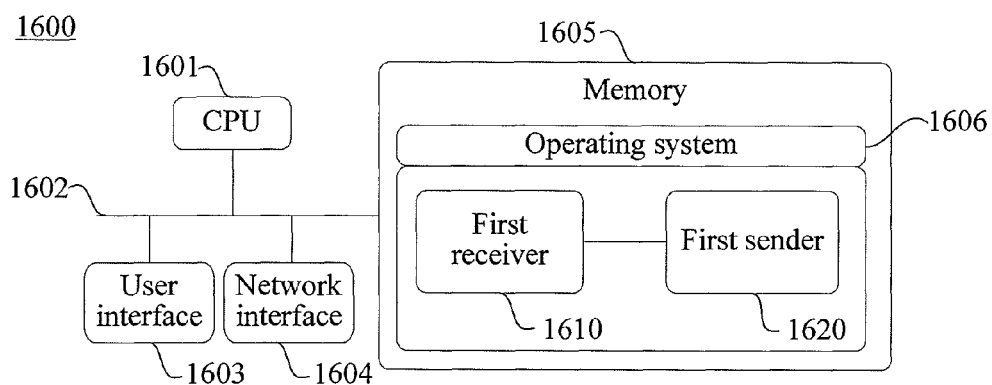
FIG. 16 is a schematic structural diagram of a coax media converter CMC according to a second embodiment of the present invention.

FIG. 16 is a schematic structural diagram of a coax media converter CMC according to a second embodiment of the present invention. As shown in FIG. 16, the CMC 1600 in this embodiment includes at least one CPU 1601, at least one network interface 1604 or another user interface 1603, a memory 1605, and at least one communication bus 1602. The communication bus 1602 is configured to implement connection and communication between devices. The CMC 1600 optionally includes a user interface 1603, which includes a display, a keyboard, or a clicking apparatus. The memory 1605 may include a high-speed RAM memory, and may also further include a non-volatile memory (non-volatile memory), for example, at least one magnetic disk memory. The memory 1605 optionally may include at least one storage device that is far away from the CPU 1601. In some implementation manners, the memory 1605 stores the following elements: a code, a module or a data structure, or a subset thereof, or an extension set thereof.

An operating system 1606 includes various programs, and is configured to implement various basic services and process a hardware-based task.

A first receiver 1610 is configured to receive a first registration request sent by at least one coaxial network unit CNU that is connected to the CMC 1600, where the first registration request carries the media access control MAC address of the CNU.

A first sender 1620 is configured to send, in a first data window allocated to the CMC 1600 by an optical line terminal OLT, a second registration request to the OLT, where the second registration request carries a first level LLID identifier allocated to the CMC 1600 by the OLT and the MAC address of the CNU, and the first data window is used for data exchange between the CMC 1600 and the OLT.

Further, the first receiver 1610 may further be configured to receive a registration message sent by the OLT, where the registration message carries the MAC address of the CNU and a second level LLID identifier that is allocated to the CNU by the OLT.

Further, the first receiver 1610 may further be configured to receive a first window message sent by the OLT, where the first window message carries the MAC address of the CNU and second data window information that is allocated to the CNU by the OLT, and the second data window is used for data exchange between the CNU and the OLT.

Further, the first sender 1620 is further configured to send, in the second data window, a registration acknowledgment message to the OLT, where the registration acknowledgment message carries the second level LLID identifier.

The CMC 1600 provided in this embodiment includes a core component that is configured to process a service, and because the core component is unrelated to a specific objective of an implementation manner, the core component is not described herein. Work processes of the first receiver 1610 and the first sender 1620 in the CMC 1600 are similar to work processes of the first receiving module 1110 and the first sending module 1120 in the CMC 1100 in FIG. 11, respectively, which are not described herein again.

By setting all functional devices, the CMC provided in this embodiment may act as an agent to send, through its first data window, an LLID registration request of a CNU that is connected to the CMC, receive a registration message returned by an OLT and a first window message that is sent by the OLT through the first data window, and send a registration acknowledgment message to the OLT through a second data window, so as to complete the registration of an LLID of the CNU on the OLT. With the logical link identifier LLID registration method in this embodiment, it is avoided that a discovery window that is broadcast by the OLT is occupied by signaling during the registration of the LLID of the CNU, thereby reducing a probability of a conflict of registration signaling by using a resource of the discovery window for LLID registration of a CMC or an ONU.

Figure 17:
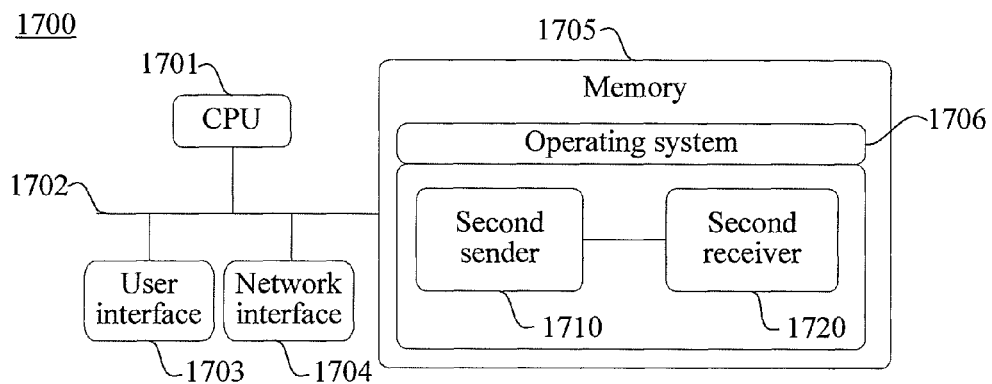
FIG. 17 is a schematic structural diagram of an optical line terminal OLT according to a fourth embodiment of the present invention.

FIG. 17 is a schematic structural diagram of an optical line terminal OLT according to a fourth embodiment of the present invention. As shown in FIG. 17, the OLT 1700 in this embodiment includes at least one CPU 1701, at least one network interface 1704 or another user interface 1703, a memory 1705, and at least one communication bus 1702. The communication bus 1702 is configured to implement connection and communication between devices. The OLT 1700 optionally includes a user interface 1703, which includes a display, a keyboard, or a clicking apparatus. The memory 1705 may include a high-speed RAM memory, and may also further include a non-volatile memory (non-volatile memory), for example, at least one magnetic disk memory. The memory 1705 optionally may include at least one storage device that is far away from the CPU 1701. In some implementation manners, the memory 1705 stores the following elements: a code, a module or a data structure, or a subset thereof, or an extension set thereof.

An operating system 1706 includes various programs, and is configured to implement various basic services and process a hardware-based task.

A second sender 1710 is configured to send a second window message to a coax media converter CMC, where the second window message carries the media access control MAC address of the CMC and first data window information that is allocated to the CMC by the OLT 1700, and the first data window is used by the CMC to send data to the OLT 1700.

A second receiver 1720 is configured to receive, in the first data window, a second registration request sent by the CMC, where the second registration request carries a first level LLID identifier allocated to the CMC by the OLT 1700 and the MAC address of the CNU.

The OLT 1700 provided in this embodiment includes a core component that is configured to process a service, and because the core component is unrelated to a specific objective of an implementation manner, the core component is not described herein. Work processes of the second sender 1710 and the second receiver 1720 in the OLT 1700 are similar to work processes of the second sending module 1210 and the second receiving module 1220 in the OLT 1200 in FIG. 12, respectively, which are not described herein again.

By setting all functional devices, the OLT provided in this embodiment may receive, through a first data window of a CMC, an LLID registration request of a CNU, where the CMC acts as an agent for the CNU and is connected to the CNU, so as to perform information exchange through the first data window to complete the registration of an LLID of the CNU on the OLT, thereby avoiding that a discovery window that is broadcast by the OLT through a registration authorization frame (DISCOVERY GATE) is occupied by the registration of the LLID of the CNU, and reducing a probability of a registration conflict by using a resource of the discovery window for LLID registration of a CMC or an ONU.

Figure 18:
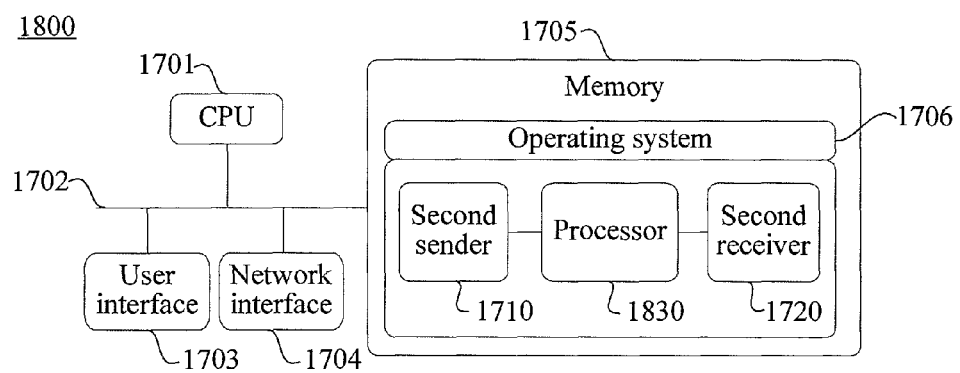
FIG. 18 is a schematic structural diagram of an optical line terminal OLT according to a fifth embodiment of the present invention.

FIG. 18 is a schematic structural diagram of an optical line terminal OLT according to a fifth embodiment of the present invention. As shown in FIG. 18, the OLT 1800 in this embodiment includes at least one CPU 1701, at least one network interface 1704 or another user interface 1703, a memory 1705, and at least one communication bus 1702. The communication bus 1702 is configured to implement connection and communication between devices. The OLT 1800 optionally includes a user interface 1703, which includes a display, a keyboard, or a clicking apparatus. The memory 1705 may include a high-speed RAM memory, and may also further include a non-volatile memory (non-volatile memory), for example, at least one magnetic disk memory. The memory 1705 optionally may include at least one storage device that is far away from the CPU 1701. In some implementation manners, the memory 1705 stores the following elements: a code, a module or a data structure, or a subset thereof, or an extension set thereof.

An operating system 1706 includes various programs, and is configured to implement various basic services and process a hardware-based task.

In addition to the second sender 1710 and the second receiver 1720 in the foregoing embodiment, the optical line terminal OLT 1800 in this embodiment further includes:

a processor 1830, configured to allocate a second level LLID identifier to the CNU according to the first level LLID identifier, where the second sender 1710 is further configured to send a registration message to the CMC, and the registration message carries the MAC address of the CNU and the second level LLID identifier.

The processor 1830 may further be configured to determine whether the first level LLID identifier is an LLID identifier that has been allocated by the OLT 1800 to the CMC, and if yes, allocate a second level LLID identifier to the CNU.

Further, the processor 1830 may further be configured to establish a mapping relationship between the first level LLID identifier and the second level LLID identifier; and the second sender 1710 is further configured to send a first window message to the CMC, where the first window message carries the MAC address of the CNU and second data window information that is allocated to the CNU by the OLT 1800, and the second data window is used for data exchange between the CNU and the OLT 1800.

Further, the second receiver 1720 is further configured to receive, in the second data window, a registration acknowledgment message sent by the CMC, where the registration acknowledgment message carries the second level LLID identifier.

Further, the second sender 1710 is further configured to broadcast a discovery window message, where the discovery window message carries discovery window information, and the discovery window is used by an apparatus connected to the OLT 1800 to send a registration request.

Further, the second receiver 1720 is further configured to receive a third registration request sent by the CMC, where the third registration request carries the MAC address of the CMC.

The OLT 1800 provided in this embodiment includes a core component that is configured to process a service, and because the core component is unrelated to a specific objective of an implementation manner, the core component is not described herein. Work processes of the second sender 1710, the second receiver 1720, and the processor 1830 in the OLT 1800 are similar to work processes of the second sending module 1210, the second receiving module 1220, and the processing module 1330 in the OLT 1300 in FIG. 13, respectively, which are not described herein again.

By setting all functional devices, the OLT provided in this embodiment may receive, through a first data window of a CMC, an LLID registration request of a CNU, where the CMC acts as an agent for the CNU and is connected to the CNU; and return a registration message to the CMC. And the OLT further sends a first window message to the CMC through the first data window, and receives, through a second data window, a registration acknowledgment message sent by the CMC, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration.

Figure 19:
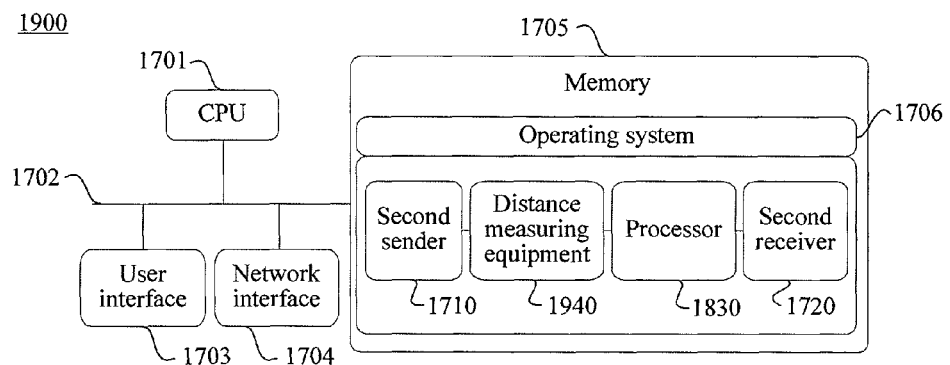
FIG. 19 is a schematic structural diagram of an optical line terminal OLT according to a sixth embodiment of the present invention.

FIG. 19 is a schematic structural diagram of an optical line terminal OLT according to a sixth embodiment of the present invention. As shown in FIG. 19, the OLT 1900 in this embodiment includes at least one CPU 1701, at least one network interface 1704 or another user interface 1703, a memory 1705, and at least one communication bus 1702. The communication bus 1702 is configured to implement connection and communication between devices. The OLT 1900 optionally includes a user interface 1703, which includes a display, a keyboard, or a clicking apparatus. The memory 1705 may include a high-speed RAM memory, and may also further include a non-volatile memory (non-volatile memory), for example, at least one magnetic disk memory. The memory 1705 optionally may include at least one storage device that is far away from the CPU 1701. In some implementation manners, the memory 1705 stores the following elements: a code, a module or a data structure, or a subset thereof, or an extension set thereof.

An operating system 1706 includes various programs, and is configured to implement various basic services and process a hardware-based task.

In addition to the second sender 1710, the second receiver 1720, and the processor 1830 in the foregoing embodiment, the optical line terminal OLT 1900 in this embodiment further includes:

a distance measuring equipment 1940, configured to determine a distance between the OLT 1900 and the CMC according to time of broadcasting a window message and time of receiving a third registration request.

The processor 1830 is further configured to determine a second data window according to the distance between the OLT 1900 and the CMC.

The OLT 1900 provided in this embodiment includes a core component that is configured to process a service, and because the core component is unrelated to a specific objective of an implementation manner, the core component is not described herein. Work processes of the second sender 1710, the second receiver 1720, the processor 1830, and the distance measuring equipment 1940 in the OLT 1900 are similar to work processes of the second sending module 1210, the second receiving module 1220, the processing module 1330, and the distance measuring module 1440 in the OLT 1400 in FIG. 14, respectively, which are not described herein again.

By setting all functional devices, the OLT provided in this embodiment may receive, through a first data window of a CMC, an LLID registration request of a CNU, where the CMC acts as an agent for the CNU and is connected to the CNU; and return a registration message to the CMC. And the OLT further sends a first window message to the CMC through the first data window, and receives, through a second data window, a registration acknowledgment message sent by the CMC, so as to complete the registration of an LLID of the CNU on the OLT, thereby avoiding that a discovery window of the OLT is occupied by the registration of the LLID of the CNU, and reducing a probability of a registration conflict by using a resource of the discovery window for LLID registration of a CMC or an ONU. Meanwhile, the OLT may further acquire a topology of EPOC during the LLID registration. The OLT may use a result of measuring a distance of the CMC during the registration of the CMC to determine a bandwidth or a time slot of a second data window granted for the CNU, thereby avoiding performing distance measurement on the CNU and simplifying a registration process.

In conclusion, in the logical link identifier LLID registration method, device, and system provided in the embodiments of the present invention, an OLT receives, through a first data window of a CMC, an LLID registration request of a CNU, where the CMC acts as an agent for the CNU and is connected to the CNU; and returns a registration message to the CMC. And the OLT further sends a first window message to the CMC through the first data window, and receives, through a second data window, a registration acknowledgment message sent by the CMC, thereby avoiding that a discovery window of the OLT is occupied by the LLID registration request of the CNU, and reducing a probability of a registration request conflict by using a resource of the discovery window for LLID registration of a CMC or an ONU. Meanwhile, the OLT may further acquire a topology of EPOC during the LLID registration. Further, the OLT may use a result of measuring a distance of the CMC during the registration of the CMC to determine a bandwidth or a time slot of a second data window granted for the CNU, thereby avoiding performing distance measurement on the CNU again and simplifying a registration process.

Persons of ordinary skill in the art may understand that all or part of the steps of the method embodiments may be implemented by a program instructing relevant hardware. The program may be stored in a computer readable storage medium. When the program is run, the steps of the method embodiments are performed. The storage medium may be any medium capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions, as long as these modifications or replacements do not cause the essence of corresponding technical solutions to depart from the spirit and scope of the technical solutions in the embodiments of the present invention.

What is claimed is:

1. A logical link identifier (LLID) registration method, comprising:

receiving, by an optical line terminal (OLT), a first registration request sent by a coax media converter (CMC) when a discovery window is opened, wherein the first registration request carries the MAC address of the CMC;

sending, by the OLT, a first window message to the CMC in response to the first registration request, wherein the first window message carries a media access control (MAC) address of the CMC and information of a first data window that is allocated to the CMC by the OLT, and the first data window is used by the CMC to send service data to the OLT;

receiving, by the OLT, in the first data window, a second registration request sent by the CMC, wherein the second registration request carries a first level LLID identifier allocated to the CMC by the OLT and a MAC address of a CNU;

determining, by the OLT, whether the first level LLID identifier is an LLID identifier that has been allocated by the OLT to the CMC, and if yes, allocating a second level LLID identifier to the CNU, and establishing a mapping relationship between the first level LLID identifier and the second level LLID identifier; and sending, by the OLT. a registration message to the CMC, wherein the registration message carries the MAC address of the CNU and the second level LLID identifier.

2. The method according to claim 1, wherein after the receiving, by the OLT, in the first data window, a second registration request sent by the CMC, the method further comprises:

sending, by the OLT, a second window message to the CMC, wherein the second window message carries the MAC address of the CNU and information of a second data window that is allocated to the CNU by the OLT, and the second data window is used for data exchange between the CNU and the OLT.

3. The method according to claim 2, wherein after the sending, by the OLT, a second window message to the CMC, the method further comprises:

receiving, by the OLT, in the second data window, a registration acknowledgment message sent by the CMC, wherein the registration acknowledgment message carries the second level LLID identifier.

4. An optical line terminal (OLT), comprising: a sender, configured to send a first window message to a coax media converter (CMC) in response to a first registration request, wherein the first window message carries a media access control (MAC) address of the CMC and information of a first data window that is allocated to the CMC by the OLT, and the first data window is used by the CMC to send service data to the OLT; and a receiver, configured to receive the first registration request sent by the CMC when a discovery window is opened, wherein the first registration request carries the MAC address of the CMC and receive, in the first data window, a second registration request sent by the CMC, wherein the second registration request carries a first level LLID identifier allocated to the CMC by the OLT and a MAC address of a CNU; and a processor, configured to allocate a second level LLID identifier to the CNU according to the first level LLID identifier;

wherein the sender is further configured to send a registration message to the CMC, wherein the registration message carries the MAC address of the CNU and the second level LLID identifier, wherein the processor is further configured to determine whether the first level LLID identifier is an LLID identifier that has been allocated by the OLT to the CMC, and if yes, allocate a second level LLID identifier to the CNU, and establish a mapping relationship between the first level LLID identifier and the second level LLID identifier.

5. The OLT according to claim 4, wherein the sender is further configured to send a second window message to the CMC, wherein the second window message carries the MAC address of the CNU and information of a second data window that is allocated to the CNU by the OLT, and the second data window is used for data exchange between the CNU and the OLT.

6. The OLT according to claim 5, wherein the receiver is further configured to receive, in the second data window, a registration acknowledgment message sent by the CMC, wherein the registration acknowledgment message carries the second level LLID identifier.

\* \* \* \* \*